United States Patent [19]

Rutenberg

[11] Patent Number: 4,870,575
[45] Date of Patent: Sep. 26, 1989

[54] SYSTEM INTEGRATED FAULT-TREE ANALYSIS METHODS (SIFTAN)

[75] Inventor: Mark R. Rutenberg, Monsey, N.Y.

[73] Assignee: ITT Corporation, New York, N.Y.

[21] Appl. No.: 103,628

[22] Filed: Oct. 1, 1987

[51] Int. Cl.$^4$ .............................................. G06F 1/00
[52] U.S. Cl. ................................................... 364/300
[58] Field of Search ....................... 364/200, 300, 900

[56] References Cited

U.S. PATENT DOCUMENTS

| | | | |
|---|---|---|---|
| 4,435,756 | 3/1984 | Potash | 364/200 |
| 4,571,679 | 2/1986 | Russell et al. | 364/300 |
| 4,578,750 | 3/1986 | Amdahl et al. | 364/200 |

OTHER PUBLICATIONS

1980 Proceedings Annual Reliability and Maintainability Symposium, IEEE (US); F. Tuma: "Software/Hardware Integrated Critical Path Analysis" (ICPA), pp. 384–387.

IEEE Transactions on Software Engineering, vol. SE-11, No. 1, Jan. 1985 IEEE (US); M.O. Fryer: "Risk Assessment of Computer Controlled Systems, " pp. 125–129.

The Journal of Systems and Software, vol. 3, No. 1, Mar. 1983; Elsevier North Holland Inc. (NL), N. G. Leveson et al.; "Software Fault Tree Analysis," pp. 173–181.

*Primary Examiner*—Raulfe B. Zache

*Attorney, Agent, or Firm*—Thomas N. Twomey; Mary C. Werner

[57] ABSTRACT

The subject invention employs a system integrated fault-tree analysis (SIFTAN) which has the unique ability to detect all latent hardware and software design defects that could cause unanticipated critical failure of a complex software controlled electronic system. This new approach modifies and then integrates two existing system analysis techniques-namely, hardware fault-tree analysis (HFTA) and software fault-tree analysis (SFTA). The resultant integrated technique is identified as SIFTAN for system integrated fault-tree analysis. Through its integrated hardware/software scope and its critical failure focus, SIFTAN has unique potential to solve the essential analytical limitation behind the software reliability problem. The system exceeds the scope of all current system analysis techniques by providing a system free from all potential critical specification hardware or software design errors. The system accomplishes the above-noted objects by performing fault tree analysis with respect to the contents of a dynamic "stack of contradiction parameters" and then superimposing the modified hardware and software fault trees onto each other. The super position is accomplished by automatically branching from the software to a specified fault tree hardware whenever hardware could result in a critical system output. It is important to indicate that the SIFTAN system is applied with great advantages to early conceptual levels of system design in addition to its certification of the final design implementation.

23 Claims, 19 Drawing Sheets

```
TYPE STATUS IS (SAFE, ALERT, ALARM):
PROCEDURE SAMPLE_COOLANT_FLOW_RATE (STATUS OUT)
    BEGIN
        STATUS:=SAFE;
        COUNT:=0;
        SUM:=0;
        MEAN:=0;
        WHILE STATUS/=ALARM
            LOOP
                WHILE COUNT<30
                LOOP
                    GET (SAMPLE);
                    SUM:=SUM + SAMPLE;
                    COUNT:=COUNT + 1;
                END LOOP
                COUNT:=0
                MEAN_FLOW:=SUM/30
                CASE MEAN_FLOW IS
                    WHEN> =100=>STATUS:=SAFE;
                    SUM:=0;
                    WHEN< 100 AND >= 98 => STATUS: =ALERT;
                    WHEN< 98 => STATUS:=ALARM;
                END CASE;
            END LOOP;
END SAMPLE_COOLANT_FLOW_RATE;
```

FIG. 5A

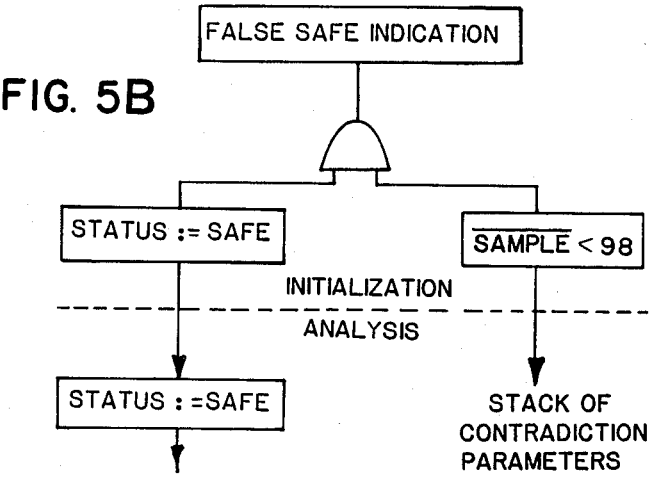

```
TYPE STATUS IS (SAFE, ALERT, ALARM):
PROCEDURE SAMPLE_COOLANT_FLOW_RATE (STATUS OUT)
    BEGIN
        STATUS:=SAFE;
        COUNT:=0;
        SUM:=0;
        MEAN:=0;
        WHILE STATUS/=ALARM
            LOOP
                WHILE COUNT < 30
                LOOP
                    GET (SAMPLE);
                    SUM:=SUM + SAMPLE;
                    COUNT:=COUNT + 1;
                END LOOP
                COUNT:=0
                MEAN_FLOW:=SUM/30
                SUM:=0;
                CASE MEAN_FLOW IS
                    WHEN >= 100 => STATUS:=SAFE;
                    WHEN < 100 AND >= 98 => STATUS:=ALERT;
                    WHEN < 98 => STATUS:=ALARM;
                END CASE;
            END LOOP;
    END SAMPLE_COOLANT_FLOW_RATE;
```

> WHAT IS THE PROBABILITY OF THE EVENT $V_2 > 10.5$?

UNKNOWN

---

> WHAT IS THE EVENT $V_2 > 10.5$ DEPENDENT ON?

$A > 5$ OR $V_3$ SHORT

---

> WHAT IS THE PROBABILITY OF THE EVENT $A > 5$?

> WHAT IS THE PROBABILITY OF THE EVENT $V_3$ SHORT ?

UNKNOWN

---

> WHAT IS THE EVENT $V_3 = 0$ DEPENDENT ON?

$C2 = 0$ AND $C4 = 0$

> WHAT IS THE PROBABILITY OF THE EVENT $C2 = 0$?

.00001

> WHAT IS THE PROBABILITY OF THE EVENT $C4 = 0$?

00001

HFTA COMPLETE

FIG. 13

1. CONTRADICTION IN SOFTWARE WHICH PREVENTS
    UNSAFE STATE   -   SAFE

2. CONTRADICTION IN SOFTWARE WHICH PREVENTS
    UNSAFE STATE BUT HARDWARE FAILURE OVERRIDES
    THAT CONTRADICTION   -   UNSAFE

3. NO CONTRADICTION IN SOFTWARE
    SIFTAN TRACES CRITICAL FAILURE OUT TO THE
    ENVIRONMENT   -   UNSAFE

4. NO CONTRADICTION IN SOFTWARE
    THRESHOLD IN ANALYSIS TIME EXCEEDED   -   UNSAFE

5. SIFTAN ENCOUNTERS AN UNANALYZABLE DATA
    STRUCTURE   -   UNSAFE

6. NO CONTRADICTION IN SOFTWARE PREVENTS THE
    CRITICAL OUTPUT BUT THE OUTPUT IS DEPENDANT
    ON HARDWARE FAILURE WITHIN AN ACCEPTABLE
    PROBABILITY THRESHOLD   -   SAFE

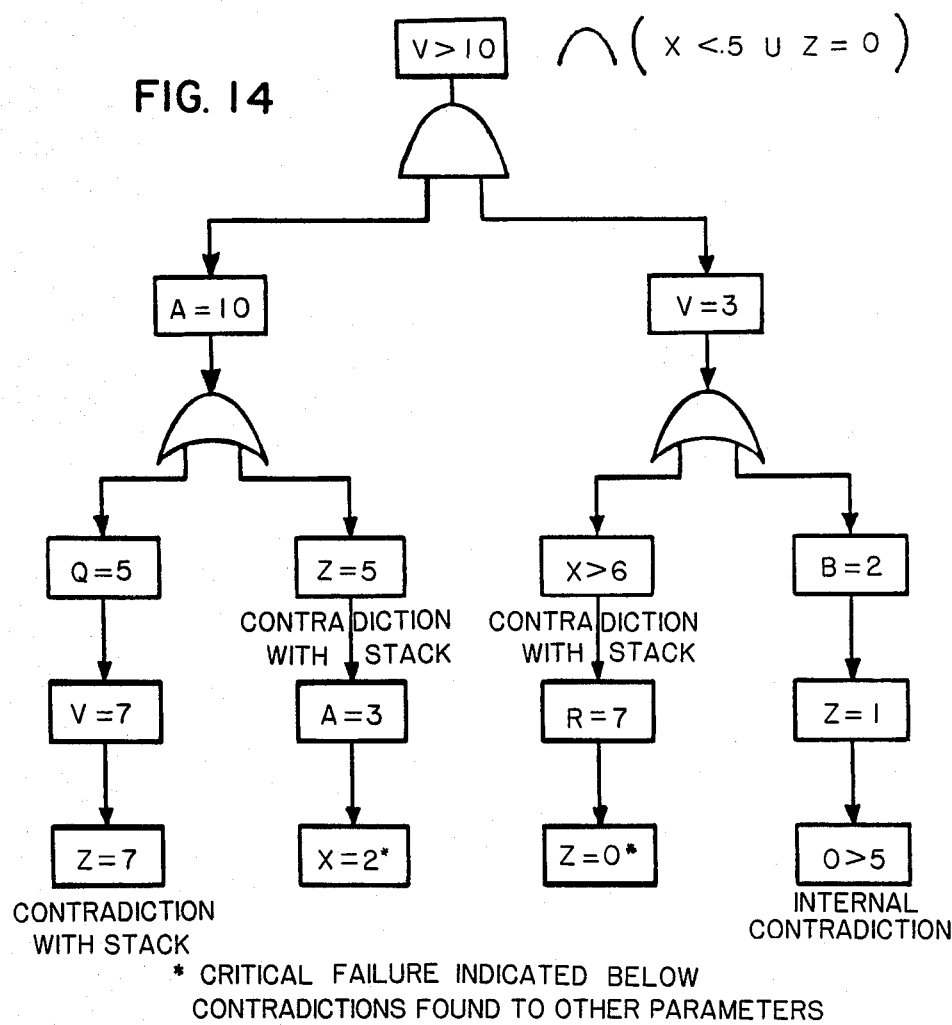

SYSTEM INTEGRATED FAULT-TREE ANALYSIS METHODS (SIFTAN)

BACKGROUND OF THE INVENTION

This invention relates to system analysis methods regarding verification and validation procedures and more particularly to a system analysis method which has the ability to detect latent hardware and software design defects which defects could cause unanticipated critical failures of digitally controlled systems.

The following references provide an overview of the precedent software fault-tree analysis and hardware fault-tree analysis technologies which are pertinent to the present system procedures as will be described.

Harvey, Peter Randall. "Fault-tree Analysis of Software". University of California, Thesis 1982.

Levenson, Nancy G., and Janice L. Stolzy. "Safety Analysis of Ada Programs Using Fault trees." *IEEE Transactions of Reliability* vol. R-32 No. 5 (December 1983; 470-579.

McIntee, Capt. James W. "Soft Tree: Fault-tree Technique as Applied to Software." Air Force Systems Command, Eglin Air Force Base, Fla. October 1983.

Taylor, J. R. "Status of Software Safety Verification and Validation Techniques." Lafayette, Indiana, U.S.A. Notes prepared for SAFECOMP 82, October 1982.

Taylor, J. R. "An Algorithm For Fault-Tree Construction." *IEEE Transactions on Reliability* vol. R-31, No. 2, (June 1982), 137-146.

Taylor, J. R. "Fault Tree and Cause Consequence Analysis for Control Software Validation."

Roskilde, Denmark: Riso National Laboratory, January 1982.

Taylor J. R. "Logical Validation of Safety and Control Systems Specifications Against Plant Models." Roskilde, Denmark: Riso National Laboratory, May 1981.

As one can ascertain and as will be further described, there has been widespread investigations of system analysis techniques.

As one can also ascertain, the prior art is replete with many examples of digitally controlled systems. Such systems extensively employ microprocessors, microcomputers, minicomputers and so on which may be distributed throughout the system which microprocessors contain extensive programs which operate to control system operation. Examples of such systems are telephone switching systems as well as many other systems utilized by the military such as digital automatic flight control systems and large scale digital communication systems in general.

As one can ascertain, system reliability is a major risk area in the development of highly integrated and complex electronic systems such as the above-noted systems as well as many systems which will be employed and are presently employed in defense electronics. The problems inherent in the design and utilization of such systems can be best understood if they are segmented between system specification and software reliability, hardware reliability and the interaction of hardware and software failure.

Errors in system specification and software are major current impediments to the achievement of system reliability. Latent specification and software failure present a serious risk to the successful development of such advanced and complicated systems. Many people who are familiar with such systems believe the problem to be so severe that it rules out the practicality of large complex software driven systems. According to this view, such systems as digital automatic flight control systems, digital telephone exchanges and digital communication systems will inevitably be released with innumerable software problems which problems will escape detection during test and integration. These problems will only manifest themselves during system operation and only when a particular aspect of the system is accessed. These possible critical errors in software system specification or coding cannot be detected until the particular threat scenarios which exercise them are encountered. Thus, as one can ascertain, such software problems or "bugs" can result in catastrophic system failure.

This problem does not only apply to future generation advanced systems but is applicable to present systems. It is clear that software reliability is a major risk item with virtually all complicated digital system acquisition techniques. Over the past year, several important techniques such as structured programming, top-down design, and self-documenting code have been developed to improve software reliability. These improvements however have not kept pace with the complexity of even current system designs.

It is clear that even utilizing all of the currently available software design verification and validation methods, delivered systems are released to customers containing numerous software specification and coding errors. It is therefore quite common for the test and debugging phase of the system to consume more time in resources than the actual initial development and design.

A related concern which will be discussed further is the fact that none of the current reliability analysis techniques can determine when the debugging phase is truly over. Essentially, what is meant by this is that in present reliability analysis techniques one cannot be assured that no undetected mission critical specification or coding errors do not remain in the design. The fundamental difficulty with software reliability is the fact that it is not possible to prove the correctness of most useful real time application software. There are simply too many possible permutations and combinations of input conditions to allow one to trace the results of each of the many sets of conditions through the software to determine system operation. In this respect a simple guidance and control or electronic warfare system has at least $10^{18}$ possible paths which are available through software routines. Even if each test could be generated, run and evaluated in a microsecond, it would take 30,000 years to test every conceivable path. There is no assurance that an untested software route, either alone or in combination with a hardware failure, will not result in a critical system failure.

Although very small elementary programs can be mathematically proven, the proof of any realistic system application software is theoretically and, practically unfeasible. Since the correctness of realistic system software cannot be proven, the only alternative has been to test software in an effort to discover latent errors. While the state of the art in static and dynamic program testing can discover many software errors, since only a tiny fraction of the possible sets of input conditions can be tested, there is no assurance given by these techniques that a considerable number of "bugs" does not remain.

Attempts have been made in the prior art to utilize the statistical approach to develop various predictive models for software error which produce a software error "MTBF" (Mean Time Between Failure). However, due to the very great differences between the causes and the mechanisms of hardware and software failures, these attempts to carry over concepts developed for predicting hardware failure rates to the software domain are necessarily highly contentious. None of the statistical models which have been proposed for prediction of software failure rates has demonstrated general applicability.

In addition, these statistical models only attempt to derive the probability that no more than a set number of errors remain in the design. They give no assurance as to the criticality of these residual errors. Essentially, as one can ascertain, the fundamental problem with current software verification and validation (V & V) techniques is that all possible inputs cannot be tested for all possible paths. Unfortunately many current software verification techniques focus on the detection of coding errors in small program modules. There is considerable evidence however that the majority of software "bugs" are not coding errors but specification errors to which these testing techniques are completely insensitive.

This fact also impacts the value of N-version programming as a software reliability tool since it increases the likelihood of common mode failures. As systems become more highly integrated, it is the specification type of software errors which will increasingly predominate. In regard to the above and in the area of hardware reliability, fault tolerance achieved through system reconfiguration upon real time detection of failure is a promising technical approach. One difficulty with system reconfiguration is that there must be an appropriate selection of which hardware resources will be protected from failure. It is generally not possible, desirable, or cost feasible to implement sufficient backup sparing so that the effects of every possible hardware failure can be masked through system reconfiguration.

The most obvious candidates for protection might not be the ones that best insure survivability. A great deal of effort and expense might be expended in application of subassemblies or other major system resources only to have the potential for critical failure remain. This could easily result from a simple but critical element required for successful reconfiguration. For example, a power supply, a switching element or an interconnecting bus may be overlooked. If such structures are overlooked and not protected from a single point failure, they can result in complete system failure.

Alternatively, a transient failure of what was assumed to be a noncritical component would cause the software to exercise a completely unanticipated path which results in a catastrophic system output. Clearly, some methodology is required that will exhaustively search for all of these possibilities and insure that the mission critical functions are protected by the system reconfiguration scheme.

Finally, an additional important difficulty with currently employed techniques for determining software and hardware reliability is that both the system software and hardware are analyzed independently of each other. During a hardware reliability analysis (e.g. FMECA) Failure Mode Effects and Criticality Analysis, it is falsely assumed that all software will function perfectly. During software verification and validation, it is falsely assumed that the software will be executed in a hardware environment which is flawless. In actuality a hardware failure can cause totally unanticipated inputs to the software which might have disastrous consequences.

Conversely, a software error in the BIT (Built-In-Test) or FDI (Fault Detection and Isolation) system or an error copied into all versions of redundant hardware can make system reconfiguration useless. The false disassociation of software and hardware reliability analysis which currently prevails prevents the optimization of system reliability in those functions where failure could have the most critical effect. A much more accurate and fruitful approach would entail simultaneous analysis of the combined hardware and software operation of the system. Hence, as one can ascertain and in summation, current design and reliability analysis techniques permit the deployment of systems with undetermined potential for critical failure.

This is particularly the case with regard to specification and software reliability. The intrinsic limitations of current techniques will result in the above-described situations and can be summarized as first the inability to cope with combinatorics of system failure potential in software driven systems; secondly, the extreme difficulty in analyzing the effects of multiple failures; and third the inability to analyze hardware and software failure interactions as well as the inability to adequately determine system reconfiguration coverage requirements.

It is therefore an object of the present invention to employ a system analysis method which method has the unique ability to detect latent hardware and software design defects that could otherwise cause the unanticipated critical failure of a digitally controlled system.

It is a further object to provide system integrated fault-tree analysis (SIFTAN) methods which operates to modify and integrate existing system analysis techniques such as hardware fault-tree analysis (HFTA) and software fault-tree analysis (SFTA) to provide an integrated technique for verifying complicated digital system operation prior to releasing the system.

BRIEF DESCRIPTION OF THE PREFERRED EMBODIMENT

A method of performing integrated fault-tree analysis on a digital software controlled system, of the type employing hardware under the control of programmed software comprising the steps of predicting a critical system output condition manifesting a top-level-event, determining from that predicted condition a set of prior system conditions which caused said event, modifying the system response to said event according to said determined set of prior system conditions.

BRIEF DESCRIPTION OF THE FIGURES

FIG. 13 is a text format showing various data steps in determining system initialization.

FIG. 14 is a block diagram showing requirement for separate analysis of OR'ed parameters in the contradiction stack according to this invention.

DETAILED DESCRIPTION OF THE INVENTION

Figure 1:
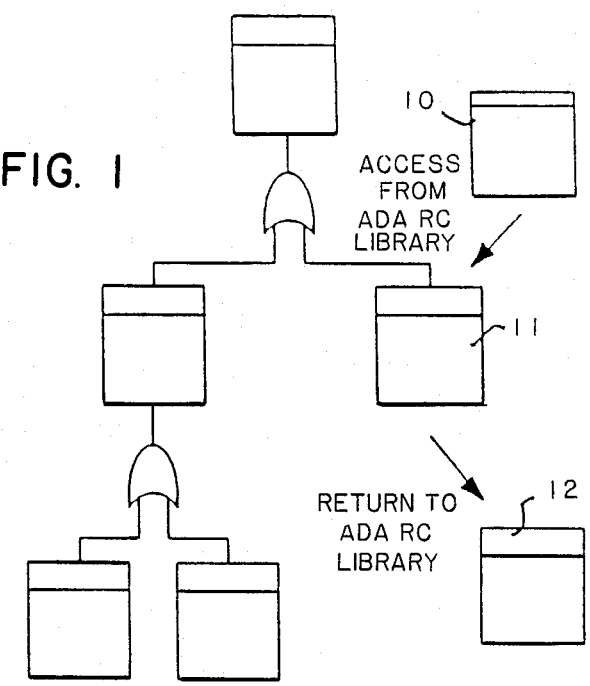
FIG. 1 is a simple block diagram showing the SIFTAN system and its growth capability through modular enhancement.

Before proceeding with a detailed description of the present invention it would be desirable to give a general description of the subject invention particularly pointing out the advantages of the system compared to the prior art.

Briefly, as indicated, all fault-tree analysis is based on the concept that in many real time application environments there are certain system outputs which are of a greater concern to a system user than others. Inappropriate states or occurrences of these system outputs are considered to be critical failures. Instead of attempting to insure the correctness of an entire design, fault-tree analysis attends only to these selected conditions of greatest concern. The basic methodology is to assume that the critical output condition, referred to as the "top-level-event" has occurred and then to work backwards to determine what conditions, if any, could have resulted in that top-level-event.

Hardware fault-tree analysis (HFTA) was initially developed over many years for ballistic missile programs to determine all possible paths which could result in an inadvertent missile launch. It is a well developed discipline and is generally accepted to be the most rigorous of the hardware reliability analysis techniques. In any event, over the last few years several researchers have attempted to develop the software fault-tree analysis (SFTA). All of these attempts are modeled on hardware fault-tree analysis and are limited to analysis of single safety related failures. As will be explained, the present apparatus and methods of the present invention consists of a fundamental modification to the methodology of both HFTA and SFTA which is followed by an integration of these modified techniques. Both HFTA and SFTA as conventionally applied are restricted to safety analysis of a single "loss event". Through the subject inventions fundamental modification to these techniques, fault-tree analysis can be applied not only to single point safety failure but to critical system outputs in general. This refocus of the object of fault-tree analysis permits a generalized format for the expression of the output conditions which are allowed to be defined as the top-level-event.

Thus, the present system integrated fault-tree analysis (SIFTAN) modifies conventional fault-tree analysis to permit a comprehensive and complex statement of each critical output to be evaluated. This is accomplished by the establishment of a stack of contradiction parameters which will be described in the text to follow. The second fundamental innovation performed by the present system and apparatus is the integration of the modified forms of HFTA and SFTA. As discussed above, a complete analysis of the critical failure potential of a design can only result from an understanding of all of the possible interactions between the system hardware and its control software.

Thus, the present system accomplishes this goal by superimposing the hardware and software fault trees onto each other. This super position is accomplished by automatically branching from the SFTA to the HFTA wherever hardware could result in a critical system outcome. At the onset, it is important to stress that the present system is applied with great value to the early conceptual level of system design. The conceptual level specification is entered into the analysis using ADA as a program design language. As one can ascertain, ADA is a programming language developed under the auspices of the United States Department of Defense (DOD) for the purpose of reducing software development and maintenance costs, especially for large constantly changing programs of long life times.

ADA was designed during the periods from 1975 to 1980 and it was specifically intended to support modern programming techniques such as structured programming, information hiding, abstract data types and concurrent processing. The original motivation for the ADA development stemmed from military command and control applications, particularly for computers "in weapons, airplanes or other military equipment". Although these applications have some special requirements, such as real time processing, concurrency and nonstandard I/O, the requirements that emerged are suitable for a general purpose programming language. The design proceeded in that spirit and as a result ADA is widely used in industrial business and university facilities as well as in the military.

There are many texts which completely describe the ADA programming language. See for example *Encyclopedia of Computer Science and Engineering* 2nd edition by A. Ralston et al. published by Van Nostrand Rheinhold Company (1983). As will be further understood, there is no actual software design that is required as the system design flow chart is substituted for software design at an early phase in the concept's development.

Similarly, an upper level block diagram of the hardware concept is entered into the analysis at this early stage for composition of the hardware fault tree. For the restricted set of critical system outputs, the present system is considerably more comprehensive than currently available reliability analysis techniques. Its superiority resides in the system's degree of analytical completeness. Current software verification and validation techniques can find many errors but due to the path combinatorics problem can give no assurance that critical errors do not remain. The present system and apparatus does give this assurance.

The path combinatorics problem is also a limitation on current hardware reliability and analysis techniques. FMECA, for example, is limited by the fundamental weakness of all forward failure prediction techniques in that it can evaluate the effect of only a small fraction of the possible component failure modality interaction scenarios. Predicting the effects of multiple failures and transient failures is very difficult and rarely attempted. Since the much more rigorous technique afforded by the present invention is directed backwards into the system from the critical failures themselves, such dangerous gaps in the investigation are precluded. The most important advantages of the present system however reside in its system integrated analysis approach. That is, not only does SIFTAN incorporate the individual power of HFTA and SFTA but it also has the unique capability of detecting all possible hardware-software critical failure interactions.

An equally important benefit of SIFTAN's integrated approach is that since it is directed to investigate any possible cause by which actual system outputs are postulated to have occurred, it is equally sensitive to the detection of specification errors as it is to software coding or hardware implementation errors. When SIFTAN analysis is applied to a particular design level, it will certify that the design is critically fail-safe or it will point out what design modifications are required to obtain this assurance. Following completion of the designated design modifications, rerunning SIFTAN analysis will certify that the design is now free of the potential for critical failure. This certification however is restricted to the design level analyzed and to all higher levels of design abstraction. If an upper level system concept is certified critical failsafe, a critical failure may still result if that concept is incorrectly implemented in the final design. It is, therefore, necessary to reapply SIFTAN analysis at each lower design level. It is theoretically possible to abstain from SIFTAN analysis until the final design is complete since this final certification assures the entire design is critical failsafe. This is a very inefficient course, however, since correction of any critical failure potential discovered by SIFTAN at this late stage may require major modifications to the entire system concept.

By applying SIFTAN to the upper level trade-off analysis and to each successive phase of a design, both the designer and the procuring agency or customer will continually be assured that all risk associated with the system under consideration has been accounted for and eliminated. As discussed above, SIFTAN can be applied manually to the upper level system concept or specification. If the system concept is represented in ADA, this can be combined with the critical failure list and the analysis begun.

If the system concept is not yet at this level of definition, the system specification is flow charted and phrased in ADA prior to initialization of the system analysis. A block diagram of the hardware concept for the system is utilized for the HFTA input.

In order to perform SIFTAN on the completed design, an automated analysis is required since hundreds or thousands of lines of embedded code and considerable hardware detail would be involved in even a small system. The automated SIFTAN analysis tool performs an algorithmic parsing of the code which represents the final system design. This parsed output is then automatically searched for a specific set of program instructions along the lines of the SIFTAN contradiction search algorithm which will be outlined below. In order to perform automated SIFTAN analysis, it is necessary to select single system design language as a standard and to build the analysis tool around it. Since ADA is mandated by DOD as the design language standard it was selected as the appropriate language.

The subject invention also can be employed utilizing other programming languages as will be clear to one skilled in the art. The potential benefits afforded by SIFTAN to software reusability are particularly important. Reusable components (RC's) will now be able to be certified as free of critical failure. SIFTAN thus provides an acceptance criteria which fills a void left by current software analysis tools. By filling this void, SIFTAN provides a new and definitive metric for establishing the trust level of reusable software. In doing so, SIFTAN defines and bounds what would otherwise be an open-ended testing requirement for reusable components. In a manner analogous to that currently used in the specification of standardized hardware components, SIFTAN can categorically certify that each reusable software component conforms to certain specified behavior as long as other specified interface constraints are maintained.

The immediate impact on the user's trust level in the software can be gauged from a comparison of the SIFTAN certification format as compared to the current disclaimers of responsibility that are presently employed for reusable ADA. The potential software user will now be certain that the risk of mission critical failure due to a latent error in a reusable component has been eliminated.

As one can understand, present software disclaimers as existing in the prior art indicate that the software and its documentation are provided "as is" and without any expressed or implied warranties whatsoever. The software is provided with the fact that no warranties as to performance, merchantability or fitness for a particular use exist.

It is further indicated that because of the diversity of conditions and hardware under which the software may be used there is no warranty of fitness for a particular purpose. Thus, the user is advised to test the prior art software thoroughly before relying on it. The user must assume the entire risk and liability of using the software. In no event shall any person or organization be held responsible for any direct, indirect, consequential or inconsequential damages or lost profits. As one can ascertain, this is a standard prologue for reusable prior art ADA and is inherent in all prior art programming. The potential software reuser in regard to the present system can be assured that there will be no errors in the integration of reusable components which could result in a mission critical system failure. The SIFTAN certification will essentially indicate that the reusable software component is certified to be free of distinct failures while indicating what hardware and software interface constraints must be observed. Thus, the SIFTAN certification is inserted as a structured comment field in each reusable component (Module, Package or Procedure) specification.

As will be understood in the following technical background section, SIFTAN analysis automatically traces a suspected critical path by working backwards along all relevant intercomponent interface linkages. If SIFTAN finds that the origin of a possible critical path could be generated from the output of another reusable component, the tool will first examine the content of the SIFTAN structured comment field found in the RC specification for that component. By doing so, SIFTAN may find that the possibility of the suspect critical path has already been eliminated by the results of a previous analysis. If this is the case, a SIFTAN analysis of the RC body is not required.

SIFTAN analysis of the RC body will only take place if the existing set of certifications found in the SIFTAN structure comment field is insufficient to rule out the possibility that a critical failure path could originate in that RC. The additional certifications resulting from the analysis of the RC body are then added to the set in the SIFTAN structured comment field. The RC is thus returned to the reusable component library with a set of reliability certifications that is enhanced over the set that the RC possessed when it was taken out of the library.

Referring to FIG. 1, this is briefly shown. Essentially, there is shown a reusable component 10 taken from ADA RC library. The additional certifications resulting from the analysis of the RC body are then added to the set in the SIFTAN structured comment field via module 11 and then retuned to the reusable component library 12 with a set of reliable certifications that is enhanced over the set that the RC possessed when it was taken out of the original library 10. Thus, the process is briefly shown in FIG. 1.

Hence, as one will understand, with each individual application of SIFTAN analysis of an RC body, the likelihood increases that only a scan of ITC SIFTAN structured comment field will be required in future SIFTAN analysis of that RC. The entire set of integrated reusable ADA components that form the overall program is of course subjected to SIFTAN analysis as a whole. The SIFTAN certifications that result from this overall analysis of the program are the ones that directly satisfy that the operationally defined "critical failure" outputs which initiated the path search cannot occur.

The entire program composed of individual reusable components is thus prepared by its SIFTAN certification to be submitted to the ADA RC library 12 as a reusable component itself. SIFTAN therefore allows the evolution of increasingly larger units of reusable software through the continual enhancement of the set of critical failure-free certifications applied to increasingly higher levels of functional abstraction. This process is shown in FIG. 2.

Figure 2:
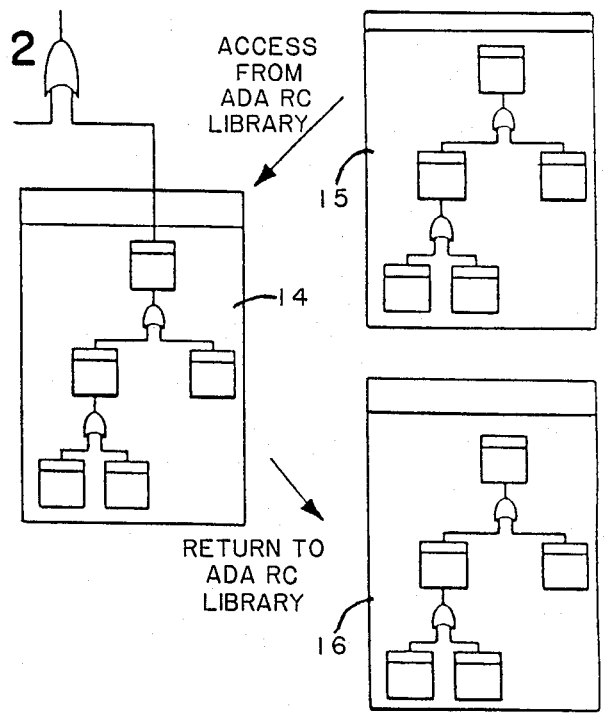
FIG. 2 is a more detailed block diagram depicting system operation as indicated briefly in FIG. 1.

In FIG. 2 there is shown a system module 14 which is operated in conjunction with a system. The system module 14 in regard to its programming or structural formation is accessed from the ADA RC library 15. Based on the above, it is now enhanced in module 14 and returned to the ADA RC library 16 in the enhanced mode. Hence, the process simply illustrated in FIG. 2 provides a disciplined method for permitting increasingly larger units of reusable software over time while objectively insuring that the trust level of these larger components are not compromised. The utilization of SIFTAN in combination with the widespread reuse of certified components will result in a complete solution to all aspects of the RC trust level problem. The likelihood that non-critical failures exist in an RC will be continually decreased over time through the collective experience of a broad community of users. Those failures, however, which a potential software user cannot afford to discover through use (i.e. critical failures) will be assured to be eliminated through the SIFTAN tool.

SIFTAN is initialized with the critical output to be searched and its stack of contradiction parameters is initialized with the conditions that are necessary to make the critical output a fault condition. At each point in the trace-back procedure, the SIFTAN tool determines the conditions that are necessary in order to reach the critical output point and compares these conditions to the Stack of Contradiction Parameters. If a contradiction to a stack element is found then the SIFTAN trace back stops for the path under analysis. If no contradiction is found then SIFTAN adds the critical path condition to the contradiction stack.

Any subsequent condition in the trace back that contradicts a condition that was placed on the stack means that the path is blocked, i.e. it cannot be traversed through both conditions. Whenever a blocked path is encountered, the conditions that were placed on the contradiction stack, back to the last branch taken, are popped off the stack. Only the conditions necessary to take the path to the critical output are analyzed at each step of the trace-back process. When all paths to the critical output have been traced and a contradiction to the stack found for each path then the program is certified free from the specified critical fault. If a path can be traversed without contradicting the stack then the critical fault path is identified and the possible fault condition indicated.

At any point where a determination of a variable value depends on hardware inputs, these inputs are stated as specification of a required hardware fault-tree analysis. When a path which requires analysis is too complex to be traced by SIFTAN within an assigned time period then SIFTAN indicates this fact by recommending that the code be simplified to support better traceability and made more reliable by adding extra checks to block off critical paths into more localized areas.

SPECIFIC DESCRIPTION OF THE OPERATION OF THE SUBJECT INVENTION

1. SIFTAN is initialized by user definition of a critical output condition. This will be a combination of events occurring simultaneous with a specified system output condition. This combination of events AND'ed with a system output condition is thereupon defined as the overall top-level-event of the SIFTAN analysis. The user-defined critical output condition can be defined with any combination of AND'ed or OR'ed simultaneous events, all of which are AND'ed with the system output. For example, "system output A occurring while either environmental condition B is false or environmental condition C is false and system configuration D is true" is a valid definition of a top-level-event.

2. The system output segment of the top-level-event defined in Step 1 above becomes the Step 3 entry point into the system software. The other members of he set of top-level-event conditions are placed in the Stack of Contradiction Parameters.

3. SIFTAN searches the parsed system software and identifies the program statement which sets the system output segment of the top-level-event.

4. The program structure (e.g. WHILE, IF-THEN or ELSE, CASE, RENDEZVOUS, SELECT) of which the program statement found in 3 is an element is then identified.

5. A generic fault-tree template for the program structure identified in 4 is retrieved from SIFTAN memory. This generic fault is particularized to identify which inputs to the program structure identified in 4 will result in the program statement output found in 3.

6. The particularized fault tree established in 5 is then examined for the existence of two types of contradictions: Internal and External.

a. Internal contradictions are composed of mathematical contradictions (e.g. 0=5) or logical contradictions internal to the fault tree of the program structure under consideration (e.g. a path within the fault tree which does not lead to the output identified in 3).

b. External contradictions are the logical or mathematical contradictions between a fault-tree statement or an element within the Stack of Contradiction Parameters.

7. If a contradiction is found in one input of a logical AND or all inputs of a logical OR, all paths which lead to those elements of the program structure fault tree are eliminated from further consideration outside of an HFTA. (REF. Step 9).

8. All input states into the particular program structure fault tree which are not eliminated during the contradiction search steps 6 and 7 become new top-level-events and the process continues at Step 3. Examples of Steps 5–8 for several common ADA program structures are:

Assignment statement
Variable-name Expression

Determine values of variables in the expression that would result in the output variable being within the range that would lead to the critical event being traced, i.e. they do not contradict stack elements. Add these values to the contradiction stack. Continue trace back looking for other assignment statements that set the values of the variable used in the expression.

IF condition "X" THEN-ELSE Structure

A. Event in THEN path=> Determine if condition "X" FALSE prior to IF clause, i.e. place "X" FALSE condition in contradiction stack. OR B. Event in ELSE path=> Determine if condition "X" FALSE prior to IF clause, i.e. place "X" FALSE condition in contradiction stack.

Continue search for all outputs that determine value of "X".

C. CASE "Y" Structure i. Event in WHEN "X" path=> Determine if condition "Y=X" TRUE prior to CASE clause i.e. place "X" condition in contradiction stack.

ii. Event in WHEN OTHERS path=> Determine if all WHEN "Y=XN" conditions FALSE prior to CASE clause, i.e. place "Y=X1" and Y=X2 AND . . . Y=Yn " FALSE" condition in contradiction stack.

Continue search for all outputs that determine value of "Y".

D. Loop Without Interaction Scheme (EXIT WHEN "X") Structure Determine if Event is output in any execution of loop prior to EXIT transfer out of loop.

i. Event in first execution of loop prior to exit statement=> No contradiction to event execution.

ii. Event output only after (N>1)th execution of loop exit statement> Determine if condition "X" FALSE for N−1 iterations of loop, i.e. place "X" FALSE condition an contradiction stack and trace back through N−1 iterations (sequentially or algorithmically as applicable).

E. FOR "X RANGE" Loop Structure

Determine if Event is output in first or only in (N>1)th execution of loop

Elaborate "X" to determine discrete range, iteration count i. Event in any execution of FOR loop=> Determine if range of "X" is not NULL prior to FOR clause.

ii. Event output only in (N>1)th execution of loop=> Determine if "X RANGE" >N−1.

F. WHILE "X" Loop Structure

Determine if Event is output in first or only in (N>1)th execution of loop i. Event in any execution of WHILE loop=> Determine if condition "X" TRUE prior to WHILE clause, i.e. place "X" condition in contradiction stack.

ii. Event output only in (N>1)th execution of WHILE loop=> Determine if condition "X" TRUE after N-1 iterations of WHILE loop i.e. place "X" condition in contradiction stack and trace back through N−1 iterations (sequentially or algorithmically as applicable).

G. PROCEDURE Calls/Returns

Event within a procedure=> Place CALL parameter values that cause event execution in contradiction stack. Continue trace back through all possible callers with required call parameter values.

Figure 12:
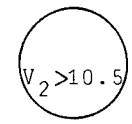
FIG. 12 is a block diagram showing the logical events necessary to complete a hardware analysis.
Figure 12:
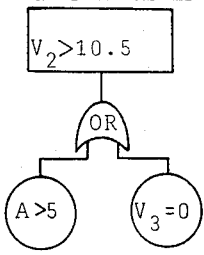
Figure 12:
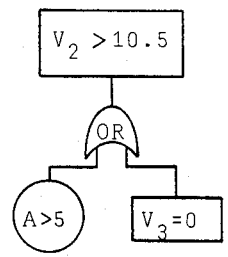
Figure 12:
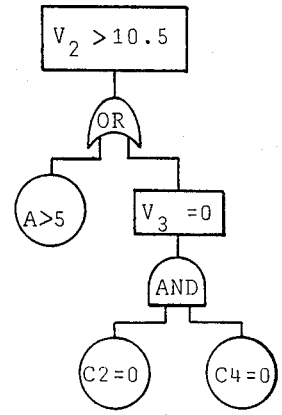

9. In every relevant instance of external data input or of output actuation found within the particularized program structure fault tree, an HFTA is automatically initiated. The identified state of the input statement or output from the output actuation statement becomes the top-level-event of the HFTA. The HFTA terminates when all inputs to it are prime events of known probability. The HFTA is accomplished by SIFTAN providing the appropriate series of prompts to the designer and the Boolean calculation of the resultant reliability. An example of this process is shown in FIG. 12.

10. IF all paths leading to the critical output condition defined in (1) are blocked by contradictions and all HFTA outcomes are above a user assigned reliability threshold, the analysis is complete. The system is thus determined to be safe from the critical failure defined in (1). If a path which is not blocked by a contradiction, or an HFTA which is below the reliability threshold is found, the analysis is also complete. The system, however, is found susceptible to the critical failure defined in (1). The source of this susceptibility is identified by the SIFTAN analysis. Following the required revision to the system design, SIFTAN analysis is reinitiated at (1) to insure proper implementation of the corrective action.

It is further important to note and in consideration of steps 1 and 6b above that combinations of simultaneously occurring events in the Stack of Contradiction Parameters which are AND'ed together are analyzed together. Separate analysis, however, is required for each OR'ed parameter in the contradiction stack. The requirement for this separate analysis of OP'ed parameters is illustrated in FIG. 14. If the analysis is not performed separately, a contradiction found in a path with respect to one parameter cannot, in and of itself, result in a conclusion of path blockage. This is because with respect to another parameter in the stack the path may allow an unblocked critical flow to the top-level=event.

The fact that separate SIFTAN analysis with respect to each OR'ed parameter will provide complete coverage results from the fact that Boolean AND distributes over Boolean OR i.e., $A \cap (B \cup C) = (A \cap B) \cup (A \cap C)$. For the case shown in FIG. 14, SIFTAN automatically performs the two required analyses:

1. $(V>10) \cap (X<5)$
2. $(V>10) \cap (Z=0)$

SIFTAN analysis is initiated by user definition of a critical system output. As discussed in the outline below this top-level-event can be specified in a highly comprehensive manner.

For purposes of illustration three hypothetical and highly simplified SDI related examples of critical design failures are shown.

Referring to FIG. 3, there will be given a system example. Essentially before describing FIG. 3, the system example to be described depicts a concept for alerting a laser satellite defense weapon control platform to the fact that a group of space based weapons or sensors is under attack. A group of weight satellites sends status messages to the satellite defense platform. The receiver on the satellite defense platform will permit up to four missing status messages and will still assume that this is due to non-hostility related failure of the transmitting satellites. However, if fewer than four status messages are received, the satellite defense platform will assume that an attack is in progress and will proceed to initiate laser effected defense all known space based assets of the adversary.

One of the critical failures associated with this concept for satellite defense is an "attack false alarm". That is, the satellite defense platform incorrectly concludes that fewer than four status messages have been received when in fact this is not the case.

Figure 3A:
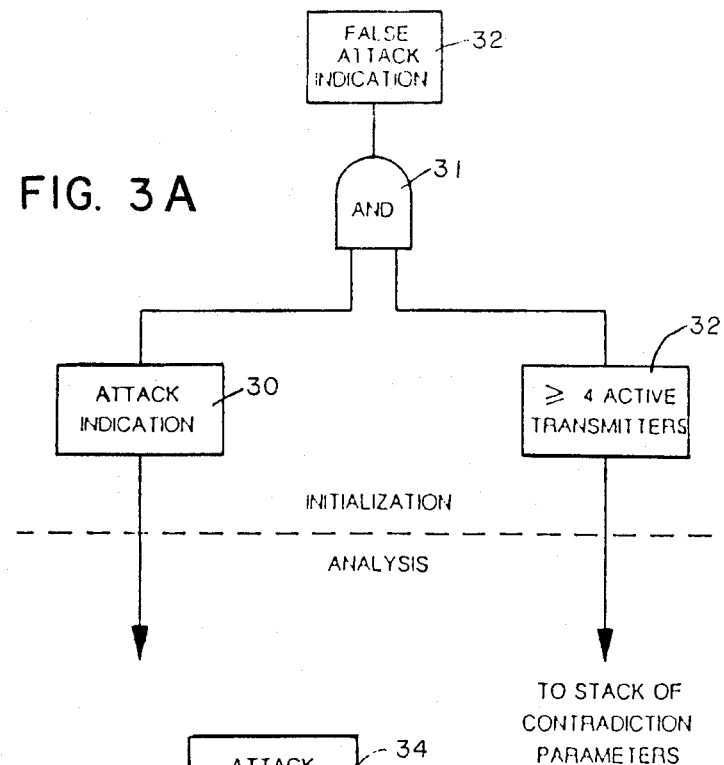
FIGS. 3A, 3B and 3C show a particular system example indicating the operation of the system.

Referring to FIG. 3A, the Figure depicts this definition of the critical failure which is that- "a conclusion of attack is made even though there are greater than four active satellites transmitting". As one can see from FIG. 3A, the attack indication is indicated by module 30. The output of module 30 goes into AND gate 31 with another input of AND gate 31 obtained from module 32 which indicates that there are fewer than four active transmitters. The output of AND gate 31 is indicated by reference numeral 32 giving a false attack indication.

Figure 3B:
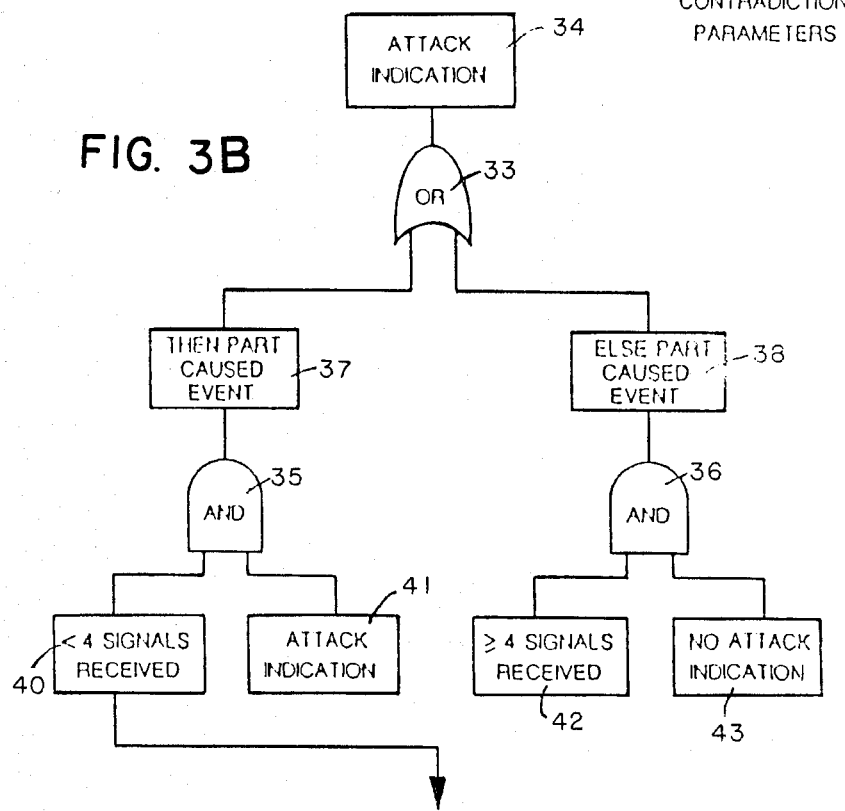
Figure 3C:
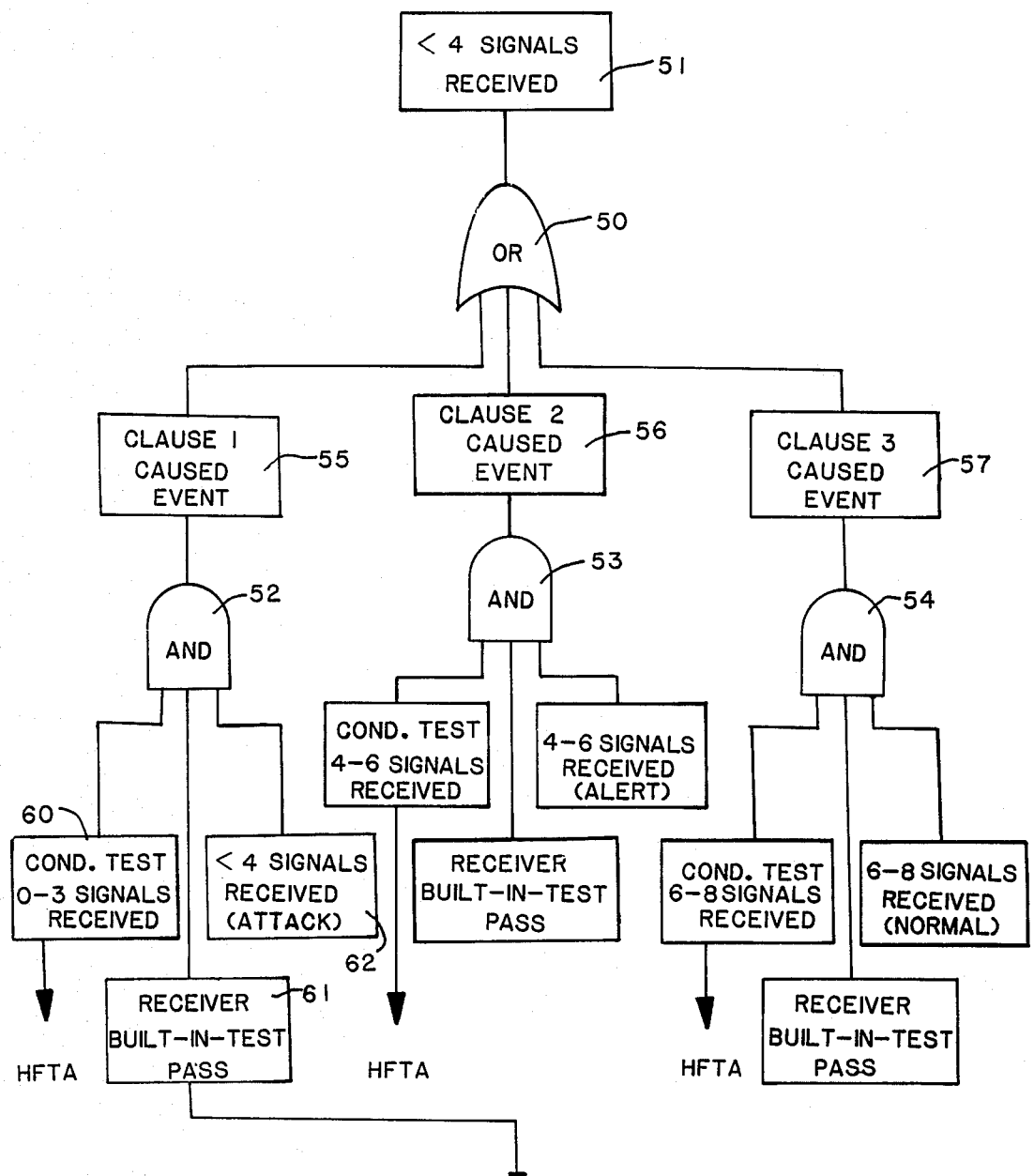

The flow of the SIFTAN analysis is partly shown in FIGS. 3B and 3C. As one can see from referring to these Figures, only the left most path is pursued as other paths are blocked by internal or external contradictions. Following the analysis to its conclusion finds that a power transient which occurs during the precise time that the receiver BIT (Built-In Test) was sampling for power stability could result in the critical failure defined. This problem is easily corrected by a restatement of the receiver BIT path criteria.

As shown in FIG. 3B, AND gate 35 is associated with module 37 which indicates the THEN PART CAUSED EVENT while the AND gate 36 is associated with module 38 which indicates the ELSE PART CAUSED EVENT. The inputs to AND gate 35 indicate that less than four signals were received via module 40 while the other input to AND gate 35 provides an attack indication via module 41. In a similar manner, AND gate 36 has one input from module 42 indicating that fewer than four signals were received and module 43 indicates a no attack indication.

Thus, as one can see from FIG. 3C, the final analysis results in the fact that there is an output OR gate 50 which has its output coupled to an attack indication module 51 indicating that greater than four signals were received indicative of an attack indication. The OR gate 50 is now associated with three AND gates 52, 53 and 54. With each AND gate indicating a specific clause which caused the event to occur. In this manner the output of AND gate 52 is coupled to module 55 indicating that CLAUSE 1 CAUSED THE EVENT. The output of AND gate 53 is coupled to module 56 indicating THAT CLAUSE 2 CAUSED THE EVENT while the output of AND gate 54 is coupled to module 57 indicating THAT CLAUSE 3 CAUSED THE EVENT.

The inputs to the AND gates are shown in FIG. 3, and for example, the input to the three input AND gate 52 indicates that the CONDITIONAL TEST WAS THEN BETWEEN ZERO TO THREE SIGNALS RECEIVED which is indicated via module 60 which is also associated with the HFTA or hardware input. The second input to AND gate 52 indicates that the RECEIVER OF CONCERN PASSED THE BIT TEST and this is shown in module 61. The third input to the AND gate 52 VIA module 62 indicates THAT GREATER THAN FOUR SIGNALS WERE RECEIVED indicative of a true attack. As one can ascertain, each of the other AND gates as 53 and 54 have corresponding inputs indicated by the various associated modules.

Hence, if any one of the AND gates provides the requisite output signal, the OR gate 50 which is an exclusive OR will indicate that less than four signals were received and via module 51 indicating attack condition.

Referring to FIG. 4, there is shown a second system example. In this particular example it is assumed that one method of filtering out false ICBM launch indications in the IR (Infrared) domain is to automatically reject high intensity events limited to a single confined area on the ground. This is because an actual first strike would more likely be generated from more than a single launch site. A confined high intensity IR event is therefore deduced by the system as a non-hostility related fire or explosion. An adversary, however, assuming this type of false alarm filtering, may in fact intentionally make use of it by coordination of a ballistic missile attack from a single launch site. A hypothetical counter-counter-measure against this strategy would be to coordinate a group of satellite sensors to examine the suspected single launch site with fine resolution from various angles. For a very short time derivative these satellites would focus on the single launch site with a very fine IR intensity resolution.

If an insufficient intensity delta is detected during this short time derivative, the satellite sensors are reformatted to the normal range. A critical failure in this example 2 as indicated in FIG. 4, is again defined as a false attack indication. A non-anticipated path which leads to this critical failure is shown in FIG. 4B. During the very short time derivative that the sensor alarms are set to a fine resolution, a higher priority interrupt occurs taking the system out of the single launch site analysis mode. This new detection algorithm assumes that the sensors are set for normal IR resolution.

However, reformatting out of the fine resolutions set previously was prevented by the interrupt. All satellites in the new scenario therefore send an alarm indication even though they have not been presented with an IR stimulus exceeding a normal range. As shown in FIG. 4B, this case of critical failure potential is an example of a typical problem which occurs in all large design efforts. Two different modules are written by two different groups each assuming that proper data formatting is being done by someone else. SIFTAN overcomes this difficulty by working backwards from module B (73) and discovering any possible path by which unformatted input could enter that module. A fundamental element of the heuristic power of SIFTAN is that it does not assume that anyone is doing their job.

Figure 4A:
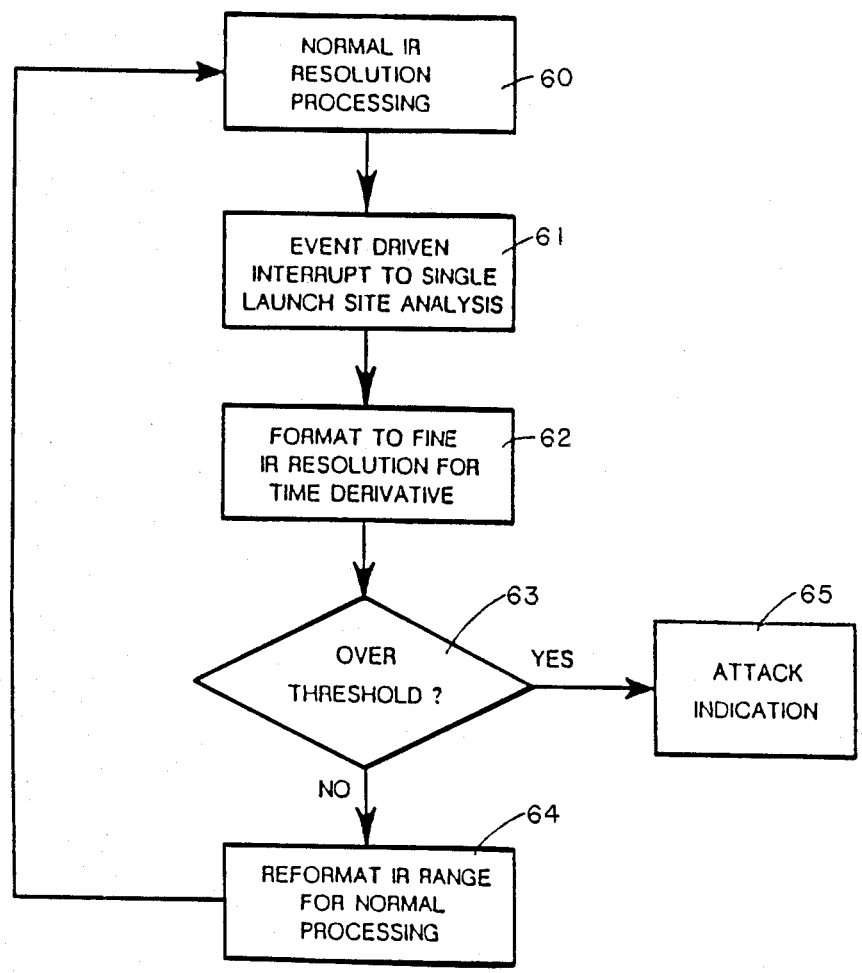
FIGS. 4A and 4B show an another example of system operation.
Figure 4B:
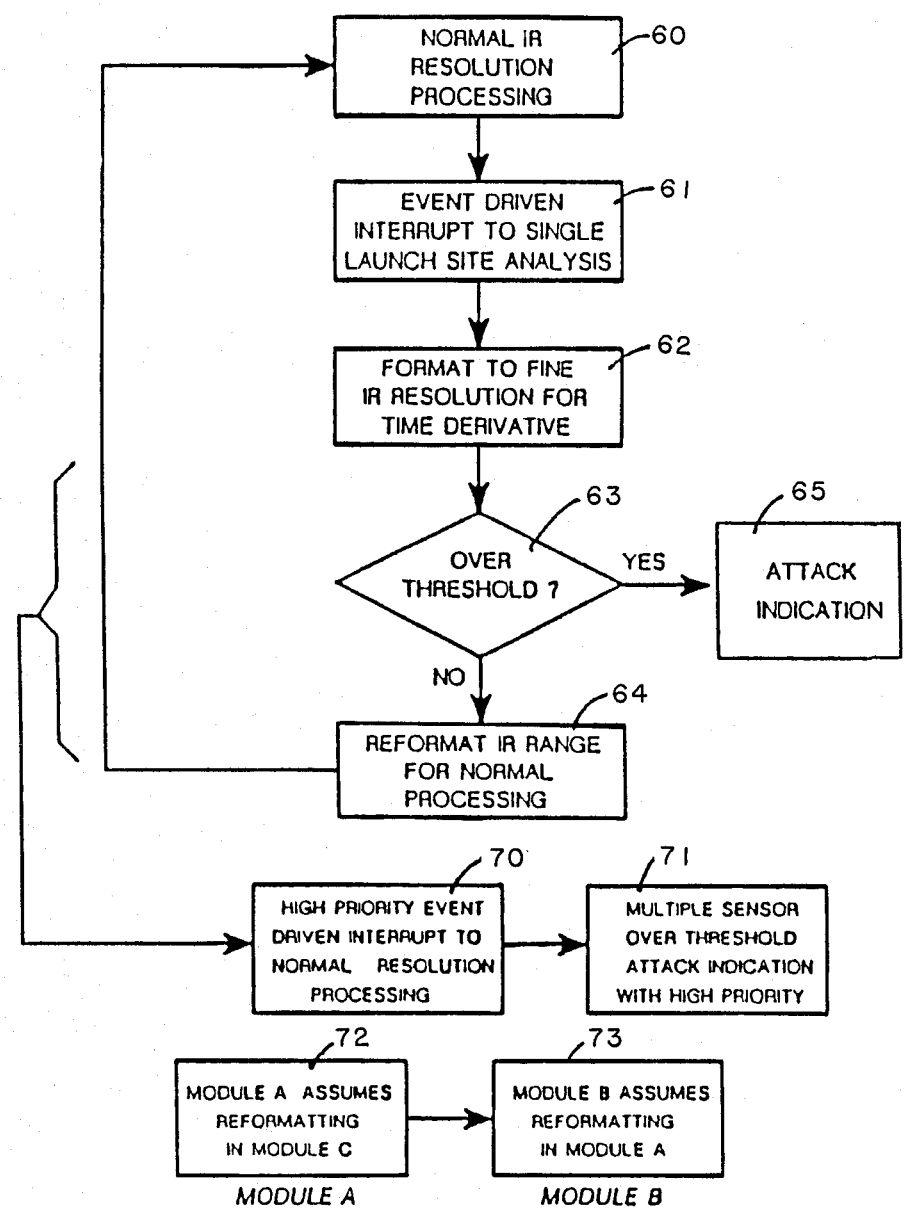

Thus, as one can ascertain from FIG. 4A, the normal IR Resolution Processing is indicated by module 60 whose output is coupled to the Event Driven Interrupt to Single Launch Site Analysis. This is indicated by module 61. The output of module 61 is coupled to module 62 which is a Format to a Fine IR Resolution for the Time Derivative. The output of module 62 goes to the decision module 63 indicative of an Over Threshold decision. Hence, if module 63 determines an over threshold (YES), it provides an attack indication indicative of module 65. If it determines that there is not an over threshold (NO) then it proceeds to Reformat the IR Range for Normal Processing as indicated by module 64 and the above sequence is repeated. As one can see from FIG. 4B, the same reference numerals have been indicated to describe the same decision making processes as in FIG. 4A. In any event, as one can ascertain, the coupling between the Reformat IR Range module 64 to the Normal IR Resolution Processing module 60 is implemented by the modules as 70 and 71 which indicate that a High Priority Event Driven Interrupt occurred to set the system to normal resolution processing.

The output of this module goes to module 71 which indicates Multiple Sensor Over Threshold which is an Attack Indication with High Priority. As indicated and is shown by modules 72 and 73, module A assumes reformatting in module B This information is sent to module 73 which then indicates that module B assumes reformatting in module A. Thus, as shown in FIG. 4B, an unanticipated path which leads to the critical failure is indicated.

Hence, during the very short time derivative that the sensor alarms are set to fine resolution, higher priority interrupt occurs taking the system out of the single launch site analysis mode. This new detection algorithm assumes that the sensors are set to normal IR resolution. Thus, as shown in FIG. 4B, this case of critical failure potential is an example of a typical problem which occurs.

Figure 5C:
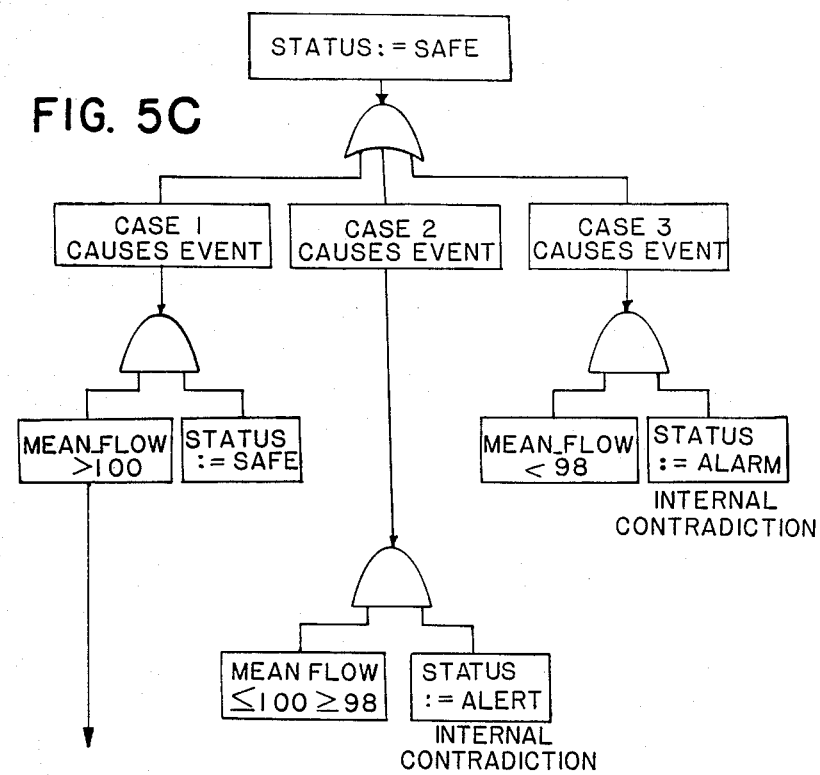
FIGS. 5A, 5AA, 5B, 5C, 5D, 5E, 5F and 5FF show a detailed analysis of the system operation according to this invention in block diagram form.
Figure 5D:
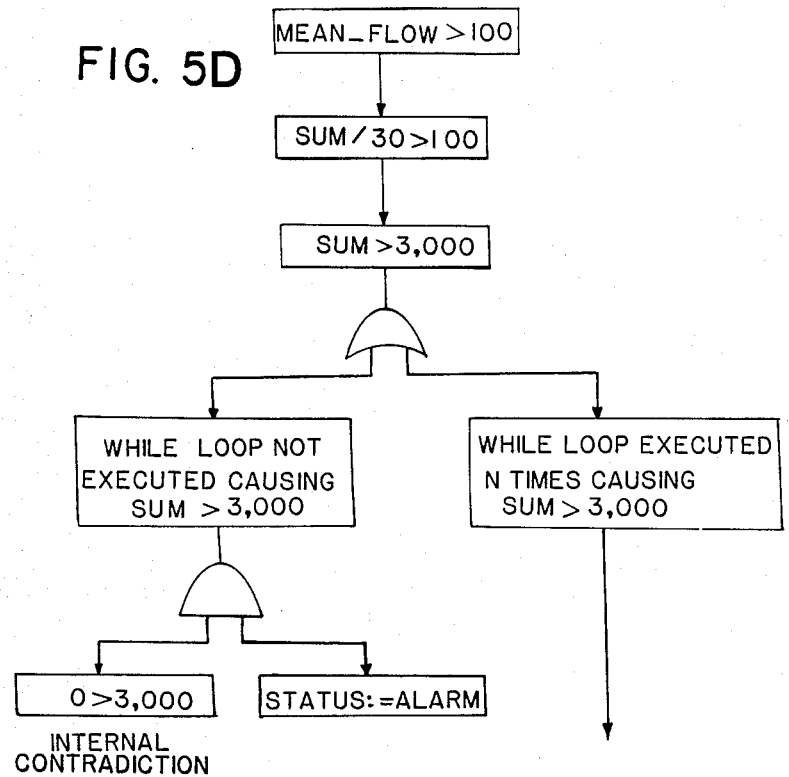

Referring now to FIG. 5A to FIG. 5FF, there is illustrated another system example which is example 3. The system example 3 as for example shown in FIG. 5A shows a concept for a nuclear reactor core coolant flow rate and failure alarm. This concept is expressed in ADA. A critical failure is defined as an average coolant flow rate of less than 98 which is not accompanied by a STATUS=ALARM. A system example 3 as for example indicated in FIG. 5B shows this initialization of the SIFTAN analysis.

Figure 5F:
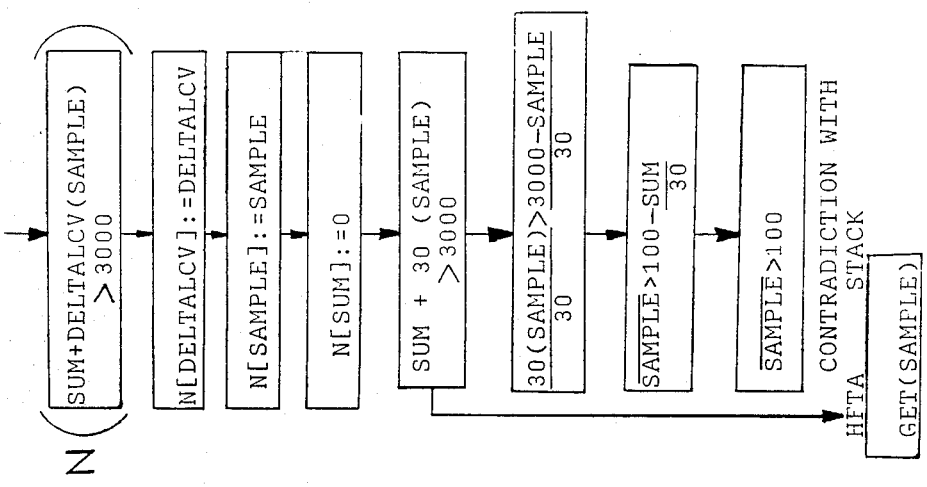
Figure 5E:
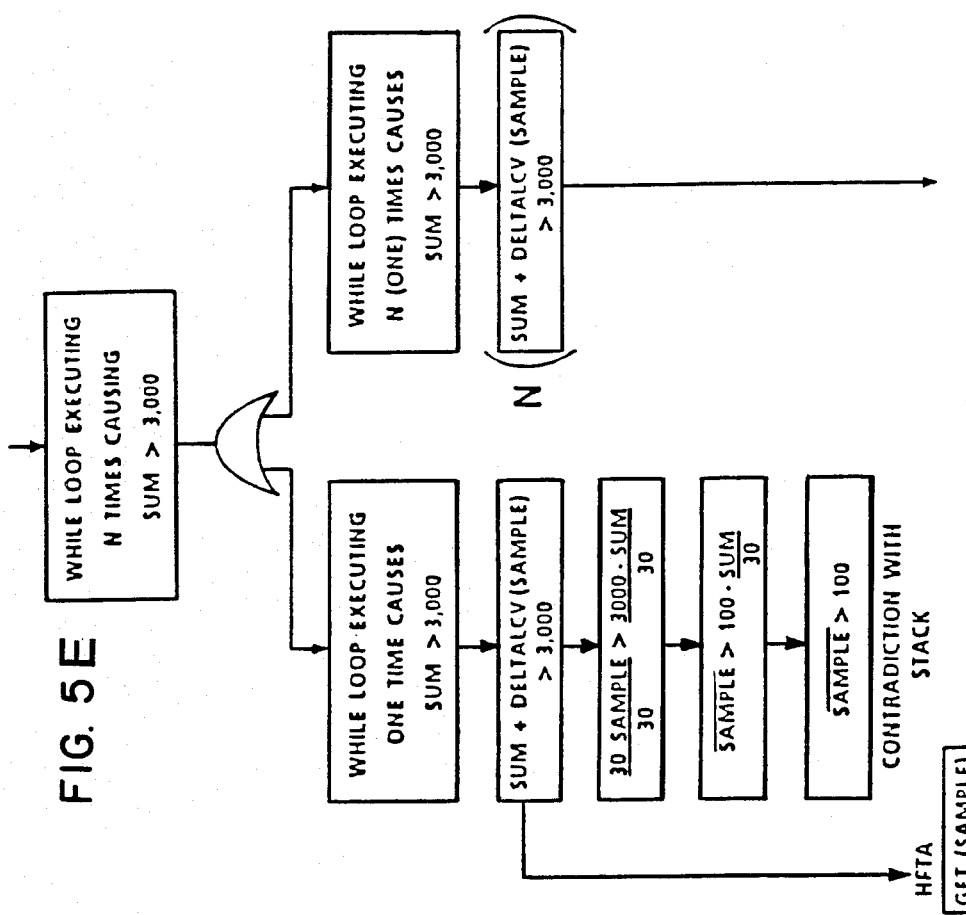
Figure 5F:
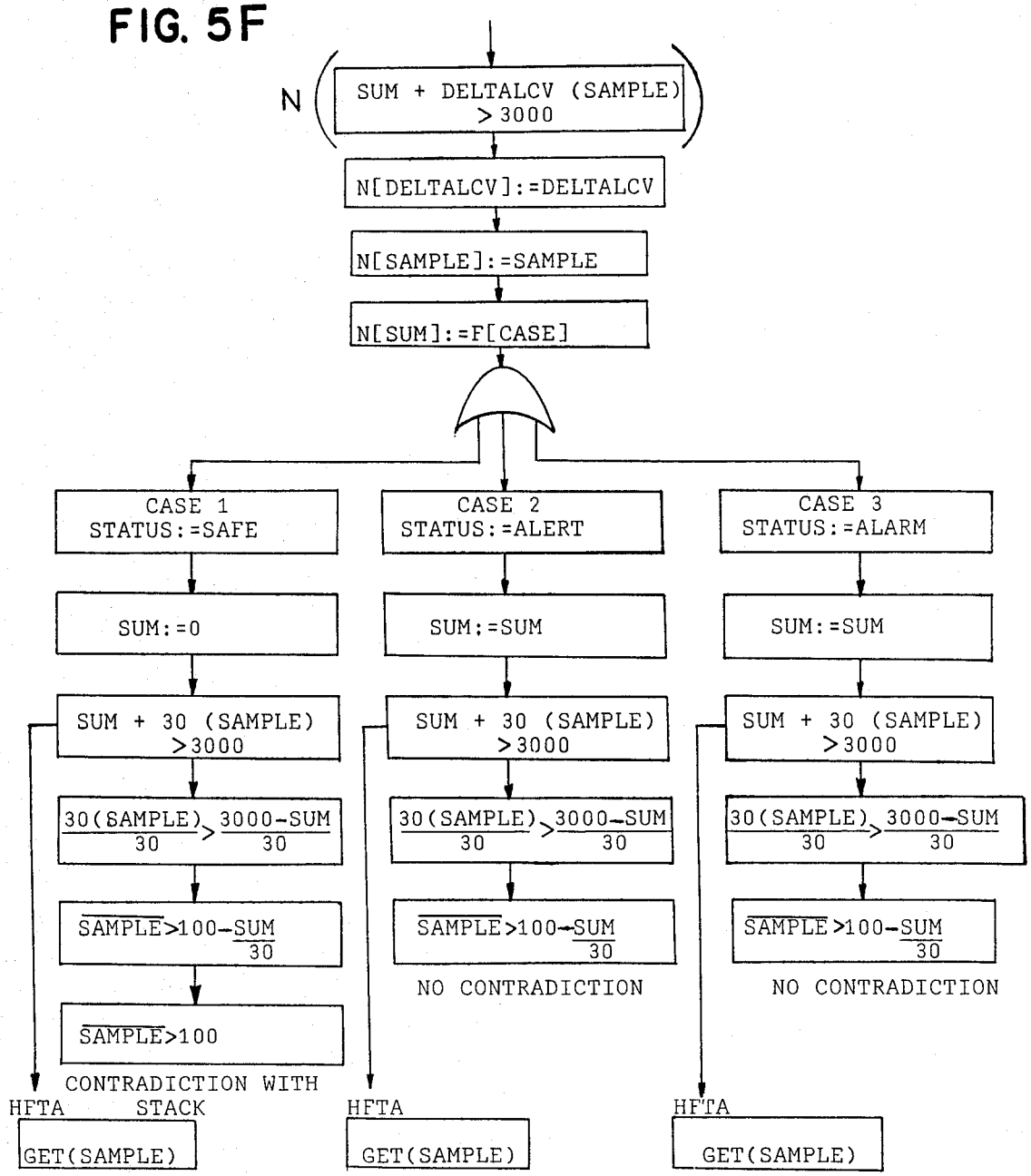

FIGS. 5C through 5FF show the SIFTAN analysis itself. As shown in FIG. 5F, the coding for the alert indication is found to present the critical failure path. In system example 3 FIG. 5AA this failure is removed from the code and FIG. 5FF shows that a SIFTAN analysis of the corrected software will now result in fail-safe certification. Each illustrates both the path combinatorics problem and the power of the new approach to overcome that problem. In all three examples, critical failure would elicit itself only under circumstances that might easily be unanticipated and undetected by conventional design analysis techniques. Critical failures of examples 1 and 2 would occur if a particular chain of events occurred during a very short and specified time interval.

Critical failure of example 3 would only occur if the coolant flow rate was found to be in the very limited alert range of 98 to 100. Due to SIFTAN's unique critical failure focus and hardware/software scope, it automatically detects the possibility of all these types of conditions.

In regard to he above, it is immediately ascertained that the system program example as depicted in FIG. 3 was taken from the actual operation and control software utilized for a defense system application. This package labeled Access Semaphore is used to control program flow to gain entry into a data base. A SIFTAN analysis was performed on this rendezvous program structure to determine if the critical failure defined as "reading from the data base while another program is writing into it" could occur.

This package was originally designed for an application which only one task at a time could request access to write into the data base. When used in this original environment, no errors were reported. It was not known to its designers, however, that another critical failure could arise if the package was reused in another application where multiple, simultaneous, write requests were possible. SIFTAN analysis of the package discovered this latent critical failure.

In any event, as one can ascertain, the following program examples are given to familiarize one with the problem as well as the solution to the same concerning the SIFTAN analysis of the Access Semaphore as described above.

The following package is used to control program flow to gate entry into a database. The procedure for using this program is as follows:

For a task that desires to read from the database:

```
ACCESS_SEMAPHORE.DB_DB_READ_REQUEST;
<code that reads the database>;
ACCESS_SEMAPHORE.DB_READ_RELEASE;
For a task that desires to write into the database:
ACCESS_SEMAPHORE.DB_WRITE_REQUEST;
<code that writes into the database>
ACCESS_SEMAPHORE.DB_WRITE_RELEASE;
package body ACCESS_SEMAPHORE_PKG is
task body ACCESS_SEMAPHORE is
type ACCESS_TYPE is (OPEN, LOCKED);
DB_USERS : Integer : = 0;
DB_ACCESS : ACCESS_TYPE := OPEN;
begin
loop
select
when DB_ACCESS = OPEN =>
accept DB_READ_REQUEST do
DB_USERS : = DB_USERS + 1;
end DB_READ REQUEST;
or
when DB_ACCESS = OPEN and DB_USERS>0=>
accept DB_read_RELEASE do
DB_USERS :=DB_USERS−1;
end DB_READ_RELEASE:
or
when DB_USERS = 0 =>
accept DB_WRITE_REQUEST do
DB_ACCESS : = LOCKED;
end DB_WRITE_REQUEST;
or
when DB_ACCESS = LOCKED =>
accept DB_WRITE_RELEASE do
DB_ACCESS :=OPEN;
end DB_WRITE_RELEASE;
end select
end loop;
end ACCESS_SEMAPHORE;
end ACCESS_SEMAPHORE_PKG;
```

A SIFTAN analysis of the above package was performed in order to determine if the critical failure of "Reading from the database while another program is writing into it" could occur. SIFTAN detected that a path to this critical failure does exist if the package is utilized in an application where there is more than one writer to the database. In the application for which this package was designed, only one writer was involved and this latent critical path was therefore not previously discovered. In order to allow its general reuse in multi-writer applications, the Access Semaphore package was modified as shown below. Re-running SIFTAN analysis on the modified code certifies that it is now free of latent critical error.

```
package body ACCESS_SEMAPHORE_PKG is
task body ACCESS_SEMAPHORE is
DB_READERS : Integer : = 0;
DB_WRITERS : Integer : = 0
begin
loop
select
when DB_WRITERS = 0 = >
accept DB_READ_REQUEST do
DB_READERS : = DB_READERS +1
end DB_READ_REQUEST;
or
when DB_READERS > 0 =>
accept DB_READ_RELEASE do
DB_READERS : = DB_READERS − 1;
end DB_READ_RELEASE;
or
when DB_READERS = 0 =>
accept DB_WRITE_REQUEST do
DB_WRITERS : = DB_WRITERS + 1;
end DB_WRITE_REQUEST;
or
when DB_WRITERS > 0 =>
accept DB_WRITE_RELEASE do
DB_WRITERS : = DB_WRITERS − 1;
end DB_WRITE RELEASE;
end select;
end loop;
end ACCESS_SEMAPHORE;
end ACCESS_SEMAPHORE PKG;
```

Figure 6:
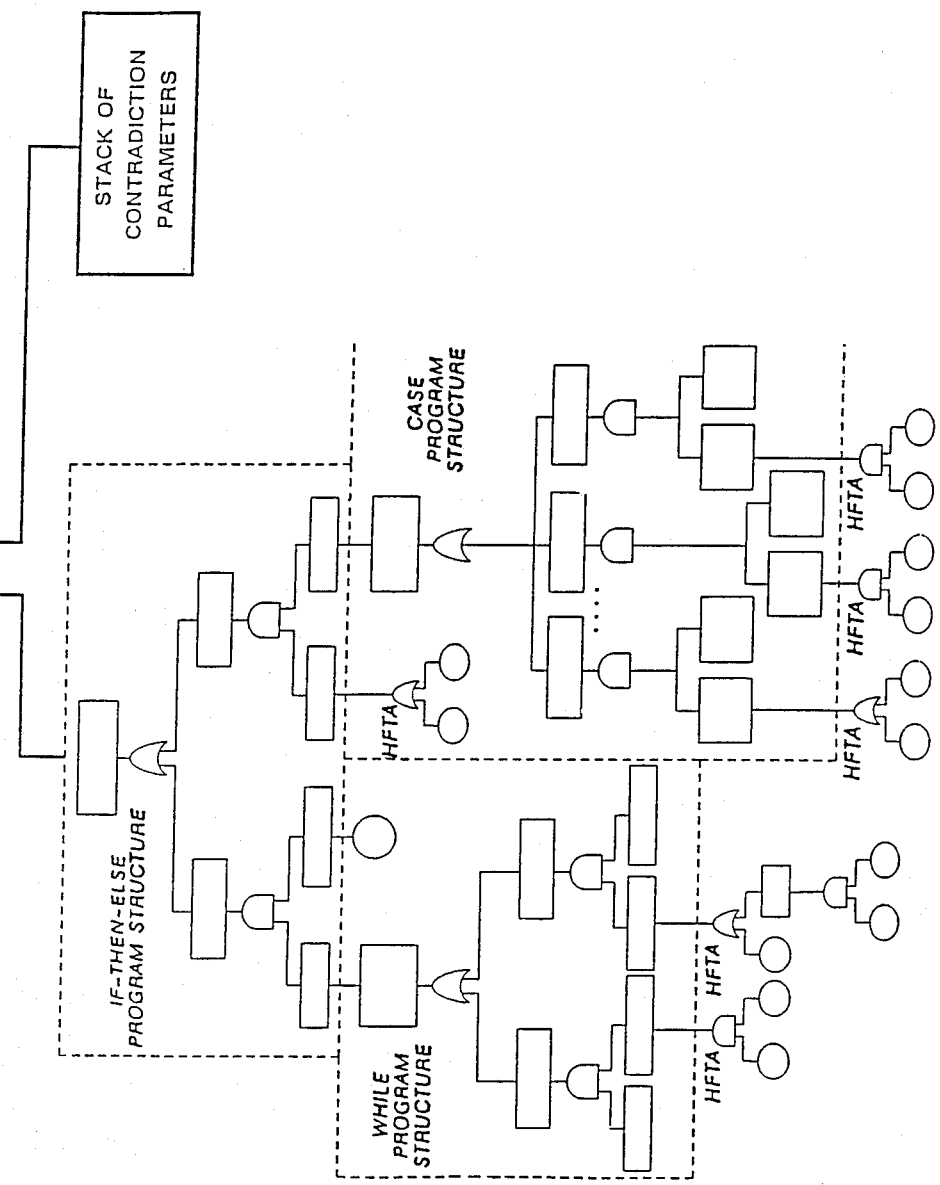
FIG. 6 is a detailed diagram showing a typical fault tree containing common program constructs.

Referring to FIG. 6, there is shown an example of the overall structures of the SIFTAN method. One will see the position of the stack of contradiction parameters and the superposition of the software fault tree with the hardware fault trees (HFTA). FIG. 6 is utilized to show as indicated a typical SIFTAN analysis and THUS contains common program constructs: CASE, WHILE, and IF THEN or ELSE.

Figure 7:
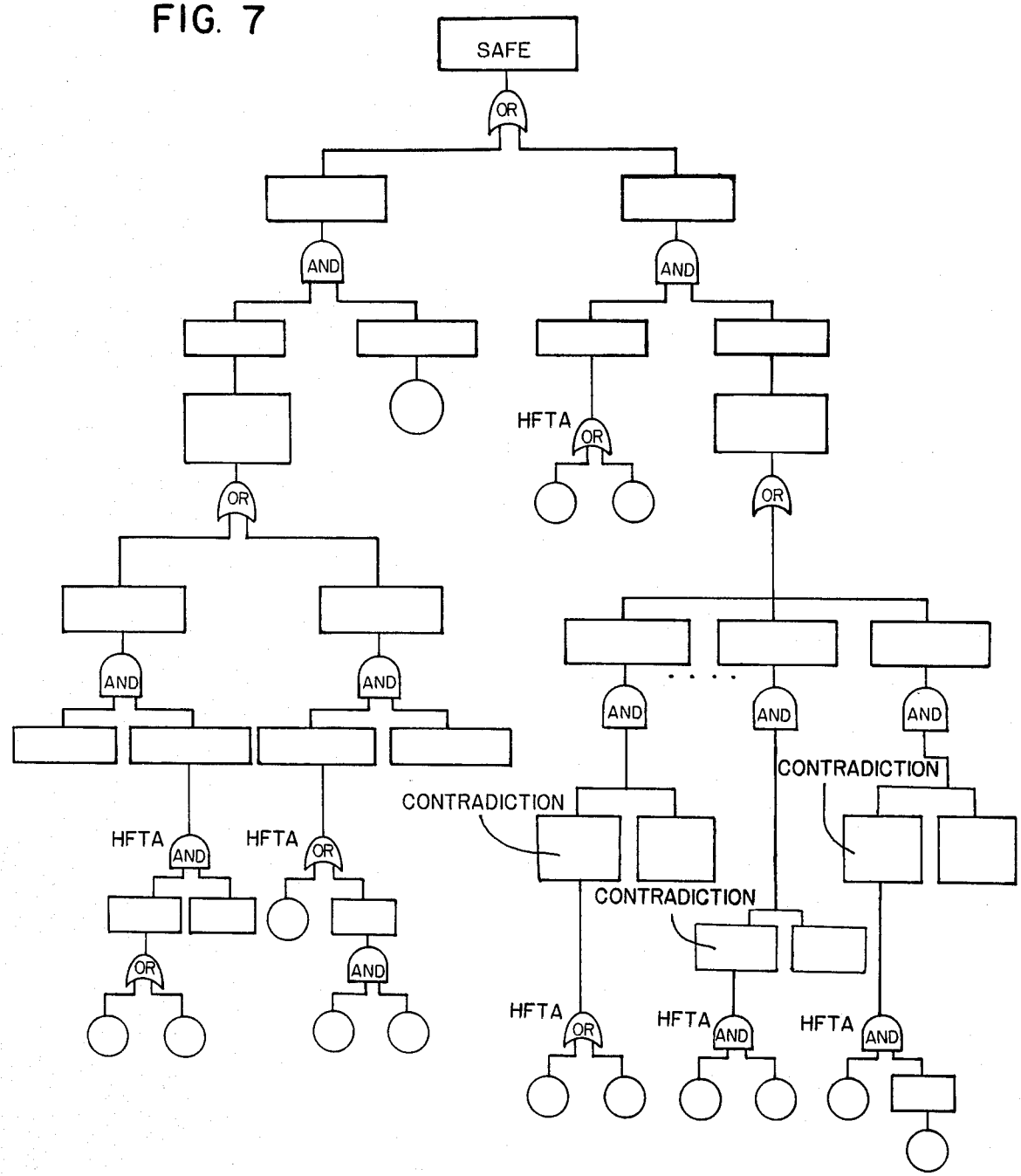
FIG. 7 is a block diagram showing a contradiction in software which prevents critical output.

FIG. 7 shows a flow chart indicating contradiction in software which prevents a critical output.

Figure 8:
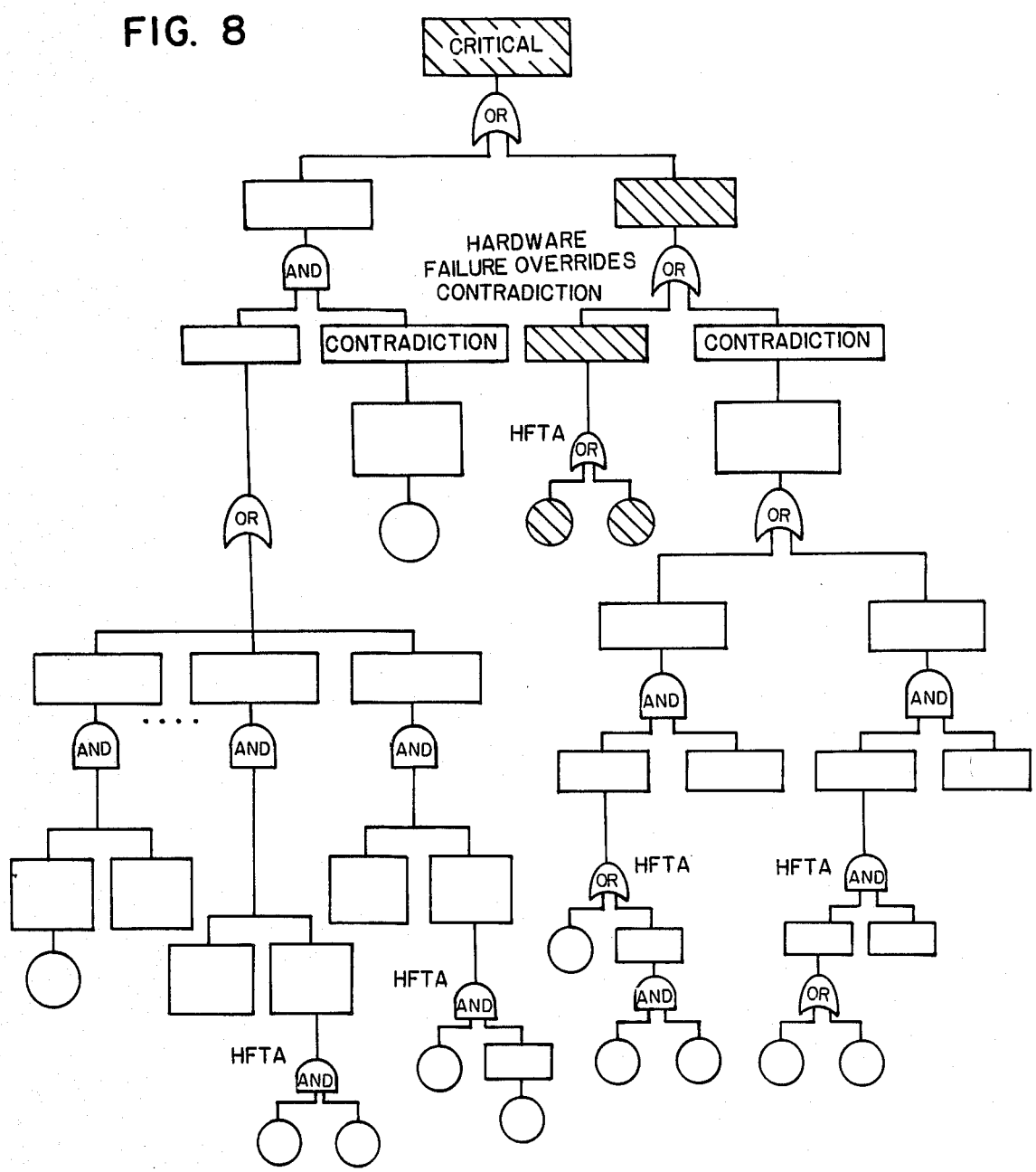
FIG. 8 is a block diagram showing a contradiction in software which prevents a critical output but hardware failure overrides the contradiction.

FIG. 8 shows the contradiction in software which prevents a critical output but hardware failure overrides that contradiction as shown by the shaded line portions of FIG. 8 as compared to FIG. 7.

Figure 9:
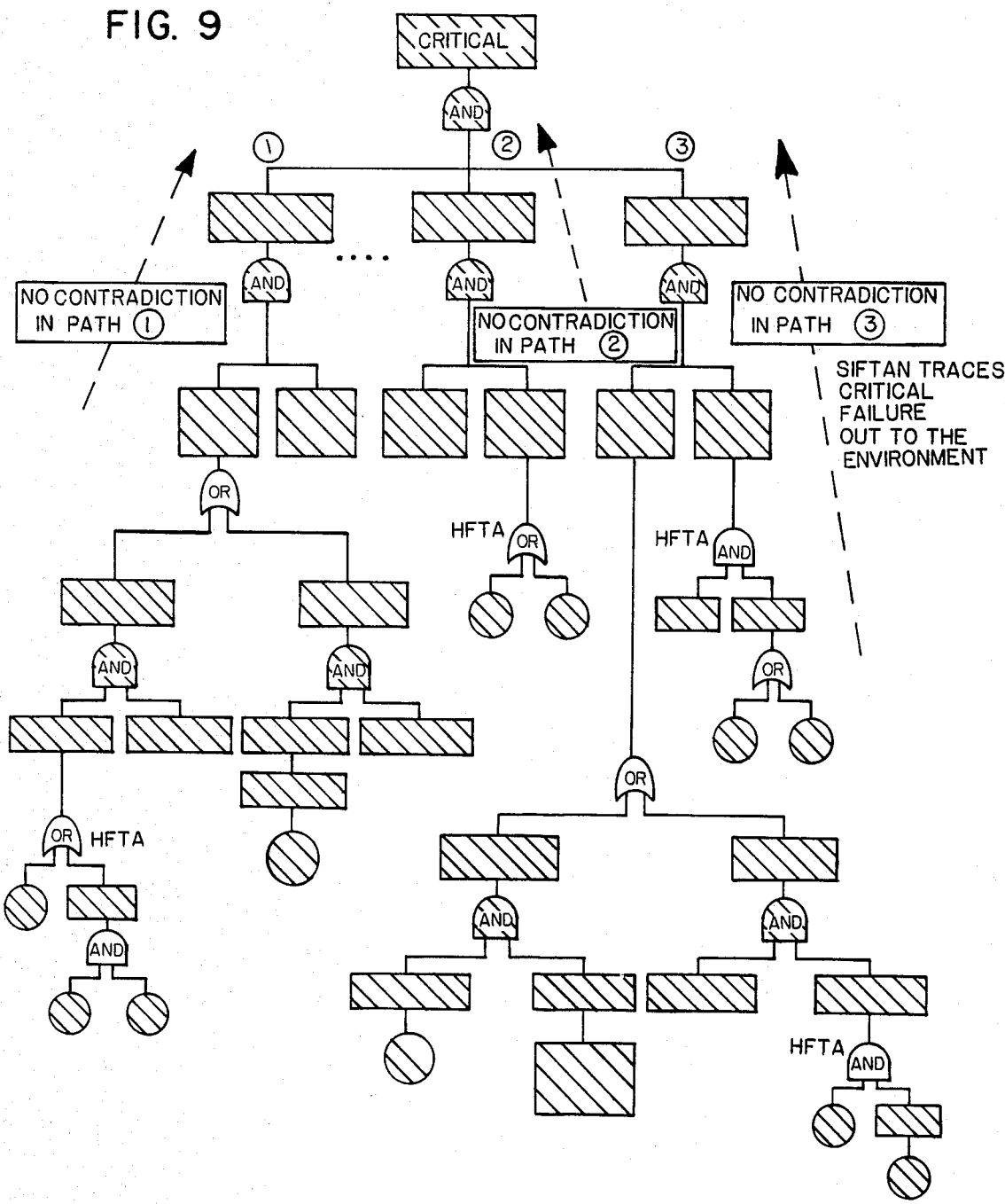
FIG. 9 is a block diagram showing the operation of this system in tracing the critical failure.
Figure 10:
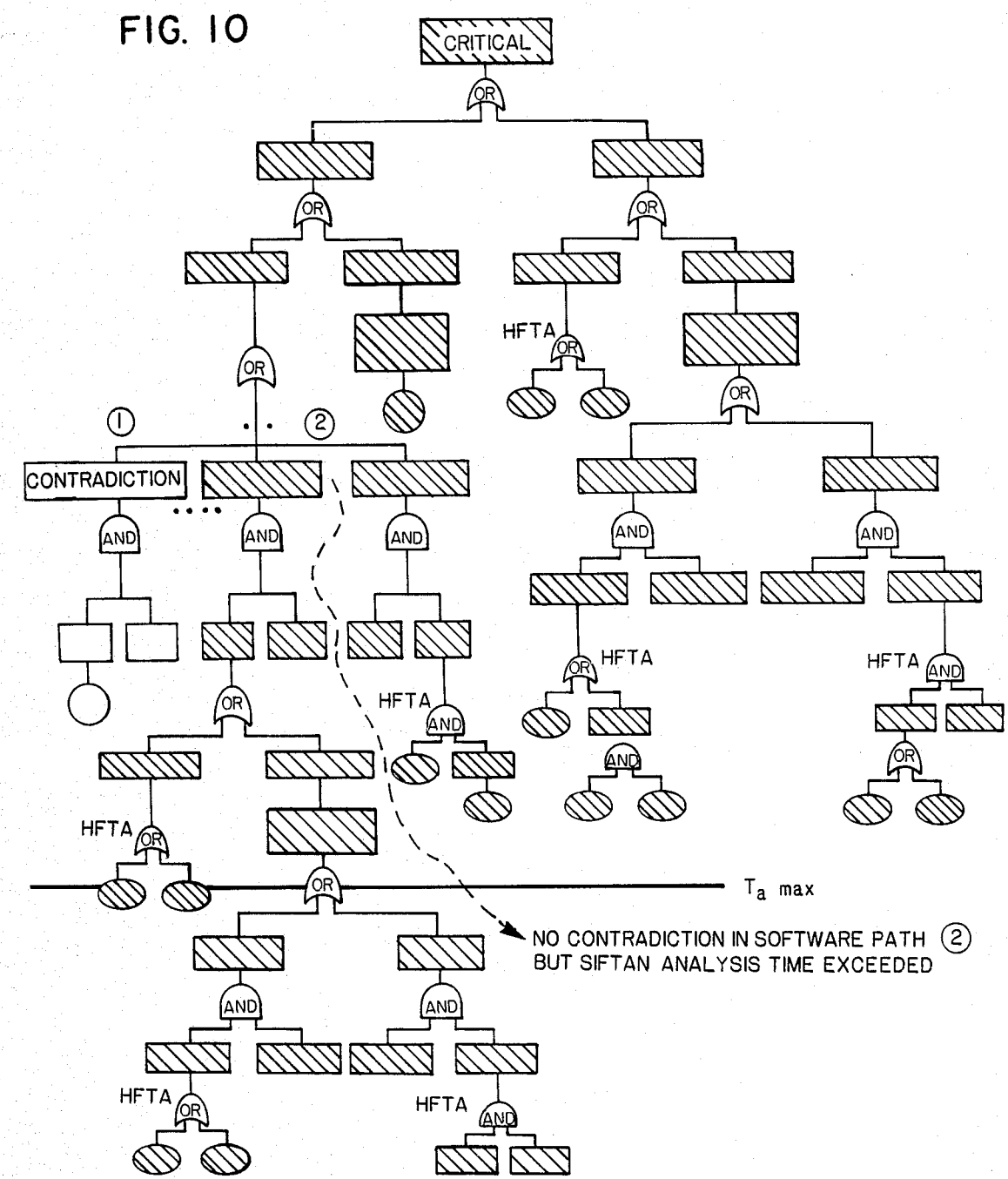
FIG. 10 is a block diagram showing the operation of this system in tracing a critical failure in regard to a threshold in analysis time.

FIG. 9 shows no contradiction in software whereby the SIFTAN system traces the critical failure to the environment indicated by shaded modules. FIG. 10 shows no contradiction in the software found within the allowed analysis time. It is noted that the system will identify the causes of all conditions as exemplified for example in FIGS. 9 and 10.

Figure 11:
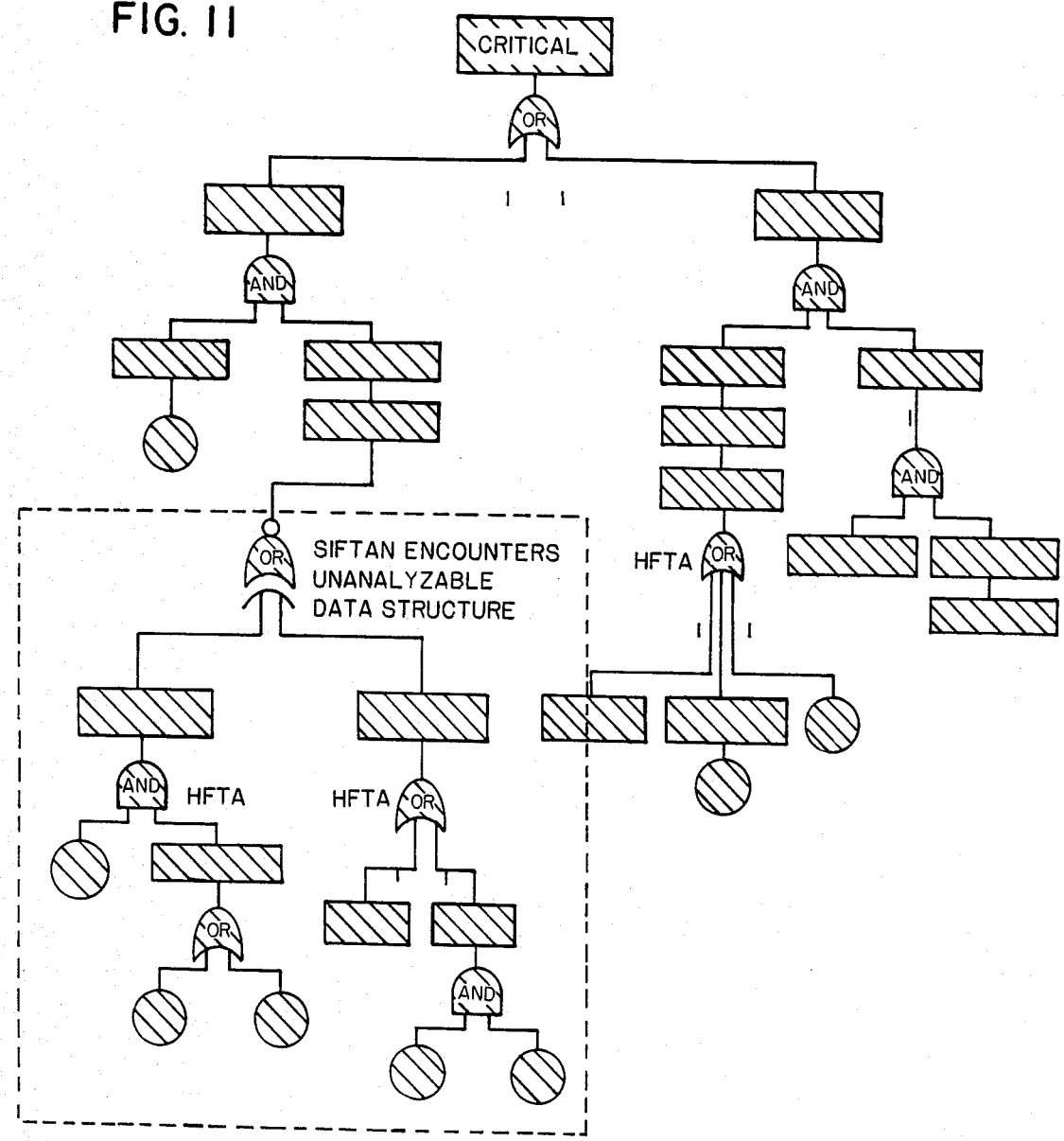
FIG. 11 is a block diagram showing the system encountering an unanalyzable data structure.

FIG. 11 shows a condition where SIFTAN encounters an unanalyzable structure while FIG. 12 as indicated traces the probability of each event to provide complete hardware analysis.

FIG. 13 indicates the various which possible outcomes can occur in the SIFTAN system enabling one to analyze safe and unsafe conditions.

FIG. 14 is a simple block diagram showing the requirements for separate analysis of Or'ed parameters in the contradiction stack as employed by the SIFTAN system.

As one will understand, the above system is intended to complement conventional hardware and software reliability assurance approaches. Because of their diffuse concern with correct operation of all system outputs, the existing techniques can find many design "bugs" but cannot give any assurance that numerous errors do not remain. Due to its focus on critical failures, the SIFTAN system can give a much stronger assurance of freedom from critical specification error as well as freedom from critical software error and provide system reconfiguration hardware coverage completeness. While the above-noted system and methods are intended for application to all design levels, the system analysis is particularly cost effective when applied to an upper level system architectural concept or specification. Detection of important latent design errors at this early stage of design avoids a much more expensive correction at a later stage in system development, testing or deployment.

The benefit of the system application to the upper level system specification is clearly seen with regard to integrated systems of the type envisioned for present and future generation digital avionics. If two formerly modular components each have $10^{18}$ paths through their respective software, their integrated combination could have as many as $10^{36}$ paths. Therefore, unless an advanced system analysis technique is employed as for example the one described above, latent software failure when dealing with future integrated systems will become even more serious than it is today.

In addition, the SIFTAN system can indicate the appropriate limits on system integration. It thus assists in the determination of how system integration can best be accomplished so that one does not end up specifying the design of a system which is organized in a fashion that is too complex to ever be reliably deployed. SIFTAN can accomplish all of these goals in a highly cost effective manner through analysis of the upper level system concept or specification. The potential applications of the above-described system are numerous and include reliability insurance for all mission critical software driven systems on both the specification and implementation levels, the certification of the trust level of reusable software, the safe development and deployment of large scale digital systems, the certification of digital flight control systems. The system provides minimum cost fault tolerance for advanced digital systems and provides improved testability through the reduction of built-in test false alarms and unverified failures. The system further creates the provision of a new evaluation metric which clearly limits the cost and risk involved in new system acquisition or existing system modification. There are many advantages of the system as one can immediately ascertain from the above-noted specification as for example determined by the claims appended hereto.

I claim:

1. A method of performing integrated fault-tree analysis on a software controlled system, said software controlled system employing a specific hardware configuration which hardware configuration is selectively operated by means of programmed software comprising the steps performed by a computer of:
   predicting a critical system output condition manifesting a top-level-event, determining from that predicted condition a set of prior system conditions which caused said event, modifying the system response upon detection of an unblocked patch to said event according to said set of prior system conditions.

2. The method according to claim 1, wherein the step of determining includes tracking backward operation from said top-level-event to a first condition prior to said event and then to a second condition prior to said first condition and so on until all conditions in a descending order have been determined.

3. The method according to claim 2, wherein the step of determining in descending order includes the step of superimposing hardware and software fault trees onto each other by branching from software to a specified hardware fault tree analysis wherever a specific hardware output could assume said prior condition, and initializing said hardware fault tree analysis with the specific parameters of said hardware output prior condition.

4. The method according to claim 1, wherein the step of predicting said top-level-event includes:

forming a system design flow chart employing a program design language and using said design flow chart to predict said top-level-event by providing a software fault tree.

5. The method according to claim 4, wherein said step of predicting said top-level-event further includes forming an upper level block diagram of the hardware configuration to provide a hardware fault tree and predicting said top-level-event by employing both said hardware and software trees.

6. The method according to claim 4, wherein said program design language is ADA.

7. The method according to claim 1, wherein the step of determining said set of prior system conditions includes the step of:

algorithmically parsing a code indicative of final system design and searching said parsed code for a specified set of program formats according to a given contradiction search algorithm.

8. The method according to claim 2, wherein the step of predicting said critical system output condition includes:

initializing a critical system output to be searched, obtaining a Stack of Contradiction Parameters indicative of conditions necessary to make said critical output a fault condition, and then the step of determining the said set of prior conditions by comparing said conditions to said stack of contradiction parameters to determine if any contradictions exist between said prior conditions and any elements in said stack, and then the further step of determining said set of prior conditions through examination of each prior condition itself for logical contradictions internal to said set of prior conditions without respect to said contradiction parameters.

9. The method according to claim 2, further including the step of certifying said modification through reapplication of the analysis according to claim 1 and 2.

10. A method of performing an integrated fault-tree analysis on a digital software controlled system said software controlled system employing a specific hardware configuration which hardware configuration is selected to operate under control of programmed software comprising the steps performed by a computer of:

defining a critical system output condition specifying a top-level-system event, forming a set of contradiction parameters indicative of the other top-level-system conditions, parsing the system software for a program statement which sets the defined top level system event, retrieving a generic fault-tree template for said program statement to identify which inputs to said program statement sets said top-level-event, examining said fault tree for contradictions according to said set of formed contradiction parameters to determine which inputs do not lead to said top-level-event, and which inputs do lead to said top-level-event, eliminating all inputs found which do not lead to said event, replacing all inputs which lead to said event for defining a new top-level-event and continuing said steps commencing with said step of parsing the system software until all inputs are eliminated.

11. The method according to claim 10, wherein the step of examining said fault tree includes the steps of determining two types of contradictions with a first type being internal contradictions indicative of paths within said fault tree which do not lead to said program statement and with the second time being external contradictions indicative of a discrepancy between a fault tree statement and an element in said set of contradiction parameters.

12. The method according to claim 10, wherein the step of defining said critical output condition includes ANDing a combination of system events with a system output condition indicative of said top-level-event.

13. The method according to claim 10, further including the steps of revising said system by modifying said hardware configuration as controlled by said software when all paths are not eliminated and then implementing the steps of claim 10 after said revision.

14. The method according to claim 10, further including the step of initiating a hardware fault-tree analysis each time said retrieved generic fault tree is examined for contradictions which depend on hardware inputs and employing said new top-level-event for said hardware fault-tree analysis.

15. The method according to claim 14, including the step of terminating said hardware fault-tree analysis when all inputs are prime events of known probability.

16. The method according to claim 15, wherein said known probability is calculated based on an assigned reliability threshold.

17. The method according to claim 10, wherein the step of retrieving said generic fault-tree template includes storing a plurality of said generic fault-tree templates in memory and accessing said memory for retrieving one of said stored plurality generic fault-tree templates.

18. The method according to claim 10, wherein the step of examining includes ANDing together combinations of simultaneously occurring events in said set of contradiction parameters, and analyzing said AND'ed combinations together, ORing other parameters in said set with other simultaneously occurring events, and separately analyzing said OR'ed combinations apart from said AND'ed combinations.

19. The method according to claim 10, wherein said digital software controlled system is a digital defense electronic system.

20. The method according to claim 10, wherein said digital software controlled system is a digital automatic flight control system.

21. The method according to claim 8 further including the step of terminating the steps of determining of prior conditions upon detection of either of the two types of said contradictions.

22. The method according to claim 11 further including the steps of adding said prior conditions to the set of contradiction parameters upon detection of neither of the two types of said contradictions.

23. The method according to claim 11 wherein, upon indication that a path to said top-level-event exists completely through the software without being blocked by one of the two types of said contradictions, an output is generated indicating that the top-level-event can occur, and the further step of outputting an indication of the location in the software where the said one blocked path residue in order to facilitate corrective modification of the system under analysis.

* * * * *